(12) United States Patent
Kagawa et al.

(10) Patent No.: US 10,993,071 B2
(45) Date of Patent: *Apr. 27, 2021

(54) INFORMATION OFFERING APPARATUS, INFORMATION OFFERING SYSTEM, AND NON-TRANSITORY COMPUTER READABLE MEDIUM

(71) Applicant: FUJI XEROX CO., LTD., Tokyo (JP)

(72) Inventors: Atsushi Kagawa, Kanagawa (JP); Kengo Tokuchi, Kanagawa (JP); Takatoshi Baba, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/703,018

(22) Filed: Dec. 4, 2019

(65) Prior Publication Data

US 2020/0107157 A1 Apr. 2, 2020

Related U.S. Application Data

(63) Continuation of application No. 16/121,182, filed on Sep. 4, 2018, now Pat. No. 10,542,373.

(30) Foreign Application Priority Data

Jan. 10, 2018 (JP) .............................. JP2018-001901

(51) Int. Cl.
*H04W 4/021* (2018.01)
*G08B 3/10* (2006.01)
*H04L 29/08* (2006.01)
*H04W 4/02* (2018.01)
*H04W 4/029* (2018.01)

(52) U.S. Cl.
CPC .............. *H04W 4/021* (2013.01); *G08B 3/10* (2013.01); *H04L 67/18* (2013.01); *H04W 4/026* (2013.01); *H04W 4/029* (2018.02)

(58) Field of Classification Search
CPC ..... H04W 4/021; H04W 4/029; H04W 4/026; G08B 3/10; H04L 67/18
See application file for complete search history.

(56) References Cited

U.S. PATENT DOCUMENTS

| | | | |
|---|---|---|---|
| 5,929,848 A | 7/1999 | Albukerk et al. | |
| 2011/0296306 A1* | 12/2011 | Oddsson | G09B 5/06 715/717 |
| 2015/0178652 A1* | 6/2015 | Schulz | H04W 8/005 705/7.25 |
| 2016/0212591 A1 | 7/2016 | Kim et al. | |
| 2018/0091924 A1 | 3/2018 | Hammerschmidt | |
| 2018/0129193 A1 | 5/2018 | Gotou et al. | |
| 2019/0050656 A1 | 2/2019 | Nomura et al. | |

FOREIGN PATENT DOCUMENTS

| | | |
|---|---|---|
| JP | 2010-128952 A | 6/2010 |
| JP | 2014-90293 A | 5/2014 |
| JP | 2015-46103 A | 3/2015 |

OTHER PUBLICATIONS

Mar. 8, 2019 Office Action Issued in U.S. Appl. No. 16/121,182.

* cited by examiner

*Primary Examiner* — Marisol Figueroa
(74) *Attorney, Agent, or Firm* — Oliff PLC

(57) ABSTRACT

An information offering apparatus includes an offering unit that offers target information concerning a target of a user's action to the user; and a changing unit that changes the target information in accordance with history information concerning the user's action.

16 Claims, 20 Drawing Sheets

FIG. 3

| SIGHTSEEING SPOT ID | SIGHTSEEING SPOT POSITION | NUMBER OF VISITS TO SIGHTSEEING SPOT | SIGHTSEEING SPOT GUIDE INFORMATION |
|---|---|---|---|
| P1 | (XP1,YP1) | 1 | M_P1_1 |
| | | 2 | M_P1_2 |
| | | 3 | M_P1_3 |
| | | 4 OR MORE | M_P1_4 |
| P2 | (XP2,YP2) | 1 | M_P2_1 |
| | | 2 | M_P2_2 |
| | | 3 | M_P2_3 |
| | | 4 OR MORE | M_P2_4 |
| P3 | (XP3,YP3) | 1 | M_P3_1 |
| | | 2 | M_P3_2 |
| | | 3 | M_P3_3 |
| | | 4 OR MORE | M_P3_4 |
| P4 | (XP4,YP4) | 1 | M_P4_1 |
| | | 2 | M_P4_2 |
| | | 3 | M_P4_3 |
| | | 4 OR MORE | M_P4_4 |

FIG. 4

| USER A | USER B | USER C | USER D | USER E |
| --- | --- | --- | --- | --- |
| (XA1,YA1) | (XB1,YB1) | (XC1,YC1) | (XD1,YD1) | (XE1,YE1) |
| (XA2,YA2) | (XB2,YB2) | (XC2,YC2) | (XD2,YD2) | (XE2,YE2) |
| (XA3,YA3) | (XB3,YB3) | (XC3,YC3) | (XD3,YD3) | (XE3,YE3) |
| (XA4,YA4) | (XB4,YB4) | (XC4,YC4) | (XD4,YD4) | (XE4,YE4) |
| (XA5,YA5) | (XB5,YB5) | (XC5,YC5) | (XD5,YD5) | (XE5,YE5) |
| ⋮ | ⋮ | ⋮ | ⋮ | ⋮ |

FIG. 9

| CHECK POINT ID | CHECK POINT POSITION | NUMBER OF VISITS TO CHECK POINT | CHECK GUIDE INFORMATION |
|---|---|---|---|
| Q1 | (XQ1,YQ1) | 1 | M_Q1_1 |
| | | 2 | M_Q1_2 |
| | | 3 | M_Q1_3 |
| | | 4 | M_Q1_4 |
| Q2 | (XQ2,YQ2) | 1 | M_Q2_1 |
| | | 2 | M_Q2_2 |
| | | 3 | M_Q2_3 |
| | | 4 | M_Q2_4 |
| Q3 | (XQ3,YQ3) | 1 | M_Q3_1 |
| | | 2 | M_Q3_2 |
| | | 3 | M_Q3_3 |
| | | 4 | M_Q3_4 |
| Q4 | (XQ4,YQ4) | 1 | M_Q4_1 |
| | | 2 | M_Q4_2 |
| | | 3 | M_Q4_3 |
| | | 4 | M_Q4_4 |

FIG. 13

| ART OBJECT ID | ART OBJECT POSITION | NUMBER OF VISITS TO ART OBJECT | ART OBJECT APPRECIATION DIRECTION | APPRECIATED ART OBJECT ID | ART OBJECT GUIDE INFORMATION |
|---|---|---|---|---|---|
| R1 | (XR1,YR1) | 1 | ANY | ANY | M_R1_100 |
| | | 2 | ANY | ANY | M_R1_200 |
| | | 3 | $\theta 1$ | ANY | M_R1_310 |
| | | 3 | $\theta 2$ | ANY | M_R1_320 |
| | | 3 | $\theta 3$ | ANY | M_R1_330 |
| | | 3 | $\theta 4$ | ANY | M_R1_340 |
| | | 4 | ANY | R2 | M_R1_402 |
| | | 4 | ANY | R3 | M_R1_403 |
| | | 4 | ANY | R4 | M_R1_404 |
| | | 4 | ANY | OTHER | M_R1_400 |
| R2 | (XR2,YR2) | 1 | ANY | ANY | M_R2_100 |
| | | 2 | ANY | ANY | M_R2_200 |
| | | 3 | $\theta 1$ | ANY | M_R2_310 |
| | | 3 | $\theta 2$ | ANY | M_R2_320 |
| | | 3 | $\theta 3$ | ANY | M_R2_330 |
| | | 3 | $\theta 4$ | ANY | M_R2_340 |
| | | 4 | ANY | R3 | M_R2_403 |
| | | 4 | ANY | R4 | M_R2_404 |
| | | 4 | ANY | OTHER | M_R2_400 |
| R3 | (XR3,YR3) | 1 | ANY | ANY | M_R3_100 |
| | | 2 | ANY | ANY | M_R3_200 |
| | | 3 | ANY | ANY | M_R3_300 |
| | | 4 | ANY | ANY | M_R3_400 |
| R4 | (XR4,YR4) | 1 | ANY | ANY | M_R4_100 |
| | | 2 | ANY | ANY | M_R4_200 |
| | | 3 | ANY | ANY | M_R4_300 |
| | | 4 | ANY | ANY | M_R4_400 |

FIG. 17

| CONFERENCE ID | LOCATION WHERE CONFERENCE IS HELD | NUMBER OF HELD SESSIONS OF CONFERENCE | PARTICIPATION OR ABSENCE IN PREVIOUS SESSION | CONFERENCE GUIDE INFORMATION |
|---|---|---|---|---|
| S1 | (XS1,YS1) | 1 | N/A | M_S1_10 |
| | | 2 | YES | M_S1_21 |
| | | 2 | NO | M_S1_20 |
| | | 3 | YES | M_S1_31 |
| | | 3 | NO | M_S1_30 |
| | | 4 | YES | M_S1_41 |
| | | 4 | NO | M_S1_40 |
| S2 | (XS2,YS2) | 1 | N/A | M_S2_10 |
| | | 2 | YES | M_S2_21 |
| | | 2 | NO | M_S2_20 |
| | | 3 | YES | M_S2_31 |
| | | 3 | NO | M_S2_30 |
| | | 4 | YES | M_S2_41 |
| | | 4 | NO | M_S2_40 |
| S3 | (XS3,YS3) | 1 | N/A | M_S3_10 |
| | | 2 | YES | M_S3_21 |
| | | 2 | NO | M_S3_20 |
| | | 3 | YES | M_S3_31 |
| | | 3 | NO | M_S3_30 |
| | | 4 | YES | M_S3_41 |
| | | 4 | NO | M_S3_40 |
| S4 | (XS4,YS4) | 1 | N/A | M_S4_10 |
| | | 2 | YES | M_S4_21 |
| | | 2 | NO | M_S4_20 |
| | | 3 | YES | M_S4_31 |
| | | 3 | NO | M_S4_30 |
| | | 4 | YES | M_S4_41 |
| | | 4 | NO | M_S4_40 | ical Field

INFORMATION OFFERING APPARATUS, INFORMATION OFFERING SYSTEM, AND NON-TRANSITORY COMPUTER READABLE MEDIUM

CROSS-REFERENCE TO RELATED APPLICATIONS

This is a Continuation of application Ser. No. 16/121,182 filed Sep. 4, 2018, which claims priority to Japanese Patent Application No. 2018-001901 filed Jan. 10, 2018. The disclosure of the prior applications are hereby incorporated by reference herein in their entireties.

BACKGROUND

(1) Technical Field

The present disclosure relates to an information offering apparatus, an information offering system, and a non-transitory computer readable medium.

(ii) Related Art

An audio guide system is known in which a guide board provided at an intersection of a street transmits pieces of guide information for respective directions to specific directions by using ultrasonic-wave-band channels, and a guide terminal which a passerby wears detects a direction which the guide terminal (the passerby) is facing on the basis of a direction from which the ultrasonic-wave guide information arrives, selects a channel corresponding to the detected direction from among the plural channels, and receives and reproduces the guide information (see, for example, Japanese Unexamined Patent Application Publication No. 2010-128952).

SUMMARY

According to an arrangement in which audio guide information of a facility present in a direction which a user is facing is merely offered, the same information is offered every time as information concerning a target of a user's action, and information that varies depending on a history concerning a user's action cannot be offered.

Aspects of non-limiting embodiments of the present disclosure relate to transmitting information that varies depending on a history concerning a user's action as information concerning a target of the user's action.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information offering apparatus including an offering unit that offers target information concerning a target of a user's action to the user; and a changing unit that changes the target information in accordance with history information concerning the user's action.

BRIEF DESCRIPTION OF THE DRAWINGS

Exemplary embodiments of the present disclosure will be described in detail based on the following figures, wherein:

FIG. 3 illustrates an example of sightseeing spot information stored in an information storage unit according to the first exemplary embodiment of the present disclosure;

FIG. 4 illustrates an example of position history information stored in the information storage unit according to the first exemplary embodiment of the present disclosure;

FIG. 9 illustrates an example of check point information stored in an information storage unit according to the second exemplary embodiment of the present disclosure;

FIG. 13 illustrates an example of art object information stored in an information storage unit according to the third exemplary embodiment of the present disclosure;

FIG. 17 illustrates an example of conference information stored in an information storage unit according to the fourth exemplary embodiment of the present disclosure;

DETAILED DESCRIPTION

Exemplary embodiments of the present disclosure are described in detail below with reference to the attached drawings.

The present exemplary embodiments provide a terminal apparatus that changes information (hereinafter referred to as "target information") concerning a target of a user's action in accordance with history information concerning the user's action and offers the changed information to the user. Examples of the user's action assumed herein include, but not limited to, the following three actions. The first action is seeing. In this case, a target of the action is a target which the user sees, i.e., a viewed target, and the target information is explanatory information explaining the viewed target. The second action is checking. In this case, a target of the action is a facility which the user checks, and the target information is instruction information concerning items to be checked of the facility. The third action is participating. In this case, a target of the action is an event in which the user participates, and the target information is explanatory information explaining a past background of the event.

A computer system constituted by such a terminal apparatus and a server on a cloud is described in detail below.

First Exemplary Embodiment

The present exemplary embodiment is an exemplary embodiment for a case in which a tourist (user) wearing a terminal apparatus does sightseeing. In the present exemplary embodiment, the terminal apparatus offers guide information (hereinafter referred to as "sightseeing spot guide information") concerning a sightseeing spot, a historic spot, or the like (hereinafter simply referred to as a "sightseeing spot") to a tourist. The action of sightseeing is an example of the action of seeing, the sightseeing spot is an example of a viewed target which the user sees, and the sightseeing spot guide information is an example of explanatory information explaining the viewed target.

Figure 1:
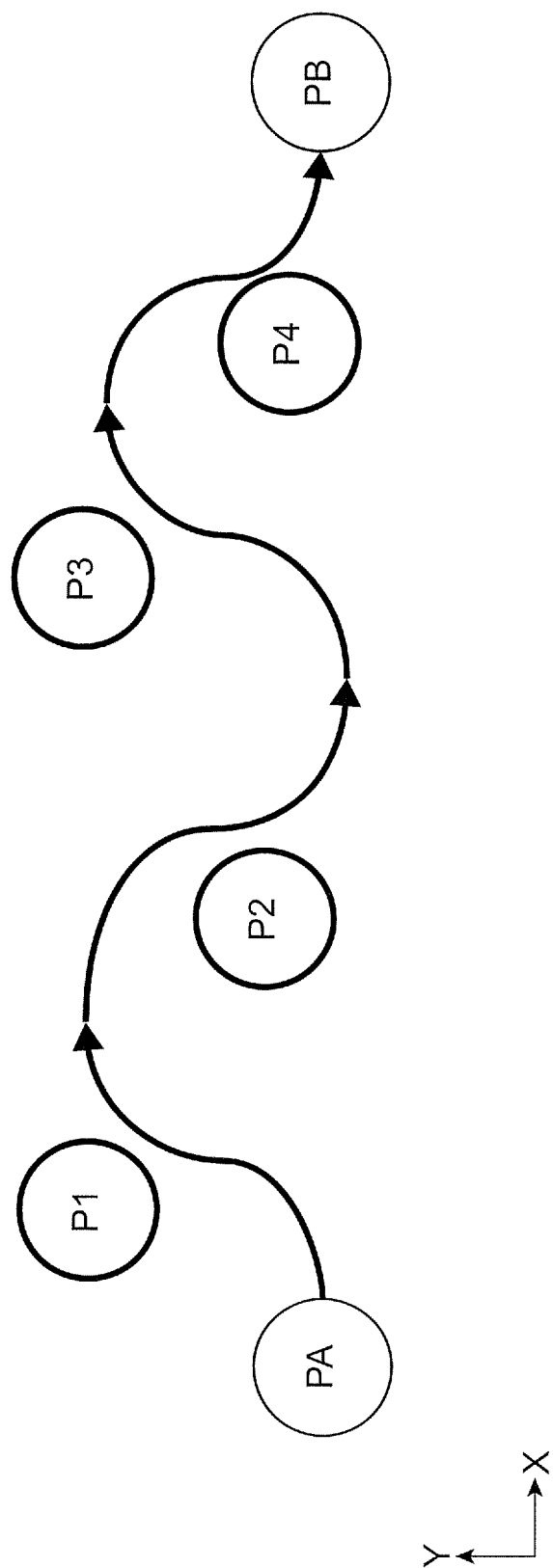
FIG. 1 illustrates an example of a route of sightseeing according to a first exemplary embodiment of the present disclosure.

FIG. 1 illustrates an example of a route of such sightseeing. It is assumed that sightseeing spots P1, P2, P3, and P4 are present between a point PA and a point PB, as illustrated in FIG. 1. A route of sightseeing in the order of the sightseeing spots P1, P2, P3, and P4 is indicated by the arrows.

While a tourist is travelling along this sightseeing route, a position detection unit incorporated into the terminal apparatus detects to which sightseeing spot the tourist is close and transmits information indicating to which sightseeing spot the tourist is close to the server on the cloud. The server on the cloud transmits audio sightseeing spot guide information stored on the cloud to the terminal apparatus. For example, when the tourist transmits information indicating that the tourist is close to the sightseeing spot P1 to the server on the cloud, the server on the cloud transmits sightseeing spot guide information concerning the sightseeing spot P1 to the terminal apparatus.

The server on the cloud, which receives and accumulates past positional information detected by the position detection unit of the terminal apparatus, determines whether the tourist visits the sightseeing spot for the first time or has visited the sightseeing spot plural times. Contents of the reproduced sightseeing spot guide information are changed depending on the number of visits.

Furthermore, the terminal apparatus detects on which side of the sightseeing spot the tourist is present and which direction the tourist is facing on the basis of information detected by the position detection unit and a direction detection unit. For example, the terminal apparatus detects that the tourist is travelling on a right side of the sightseeing spot P1 while facing forward. Then, the terminal apparatus transmits sightseeing spot guide information to an ear closer to the sightseeing spot so that the tourist's attention is drawn to the sightseeing spot. For example, in a case where the tourist is travelling on the right side of the sightseeing spot P1 while facing forward, the terminal apparatus transmits sightseeing spot guide information to a left ear. This draws tourist's attention to a left side. Even in a case where the tourist is facing a direction opposite to the sightseeing spot, the tourist is notified about a direction in which the sightseeing spot is present on the basis of a direction from which the tourist hears sound.

Figure 2:
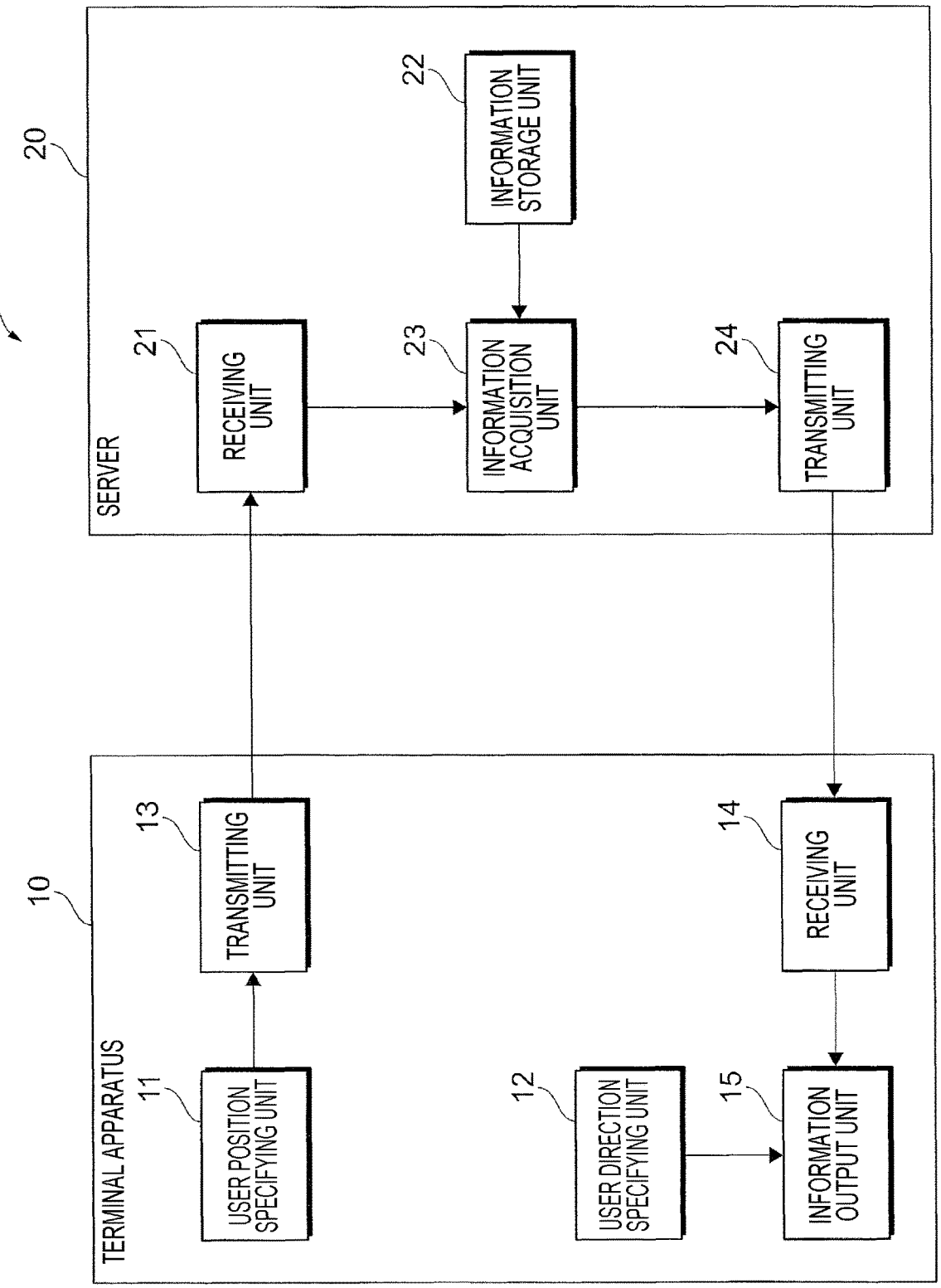
FIG. 2 is a block diagram illustrating an example of a functional configuration of a computer system according to the first exemplary embodiment of the present disclosure.

FIG. 2 is a block diagram illustrating an example of a functional configuration of a computer system 1 according to the first exemplary embodiment. As illustrated in FIG. 2, the computer system 1 according to the first exemplary embodiment is constituted by a terminal apparatus 10 that is an example of an information offering apparatus and a server 20 that is an example of a transmitting apparatus, and the terminal apparatus 10 and the server 20 are connected through a communication line.

First, a functional configuration of the terminal apparatus 10 is described. The terminal apparatus 10 includes a user position specifying unit 11, a user direction specifying unit 12, a transmitting unit 13, a receiving unit 14, and an information output unit 15.

Figure 19:
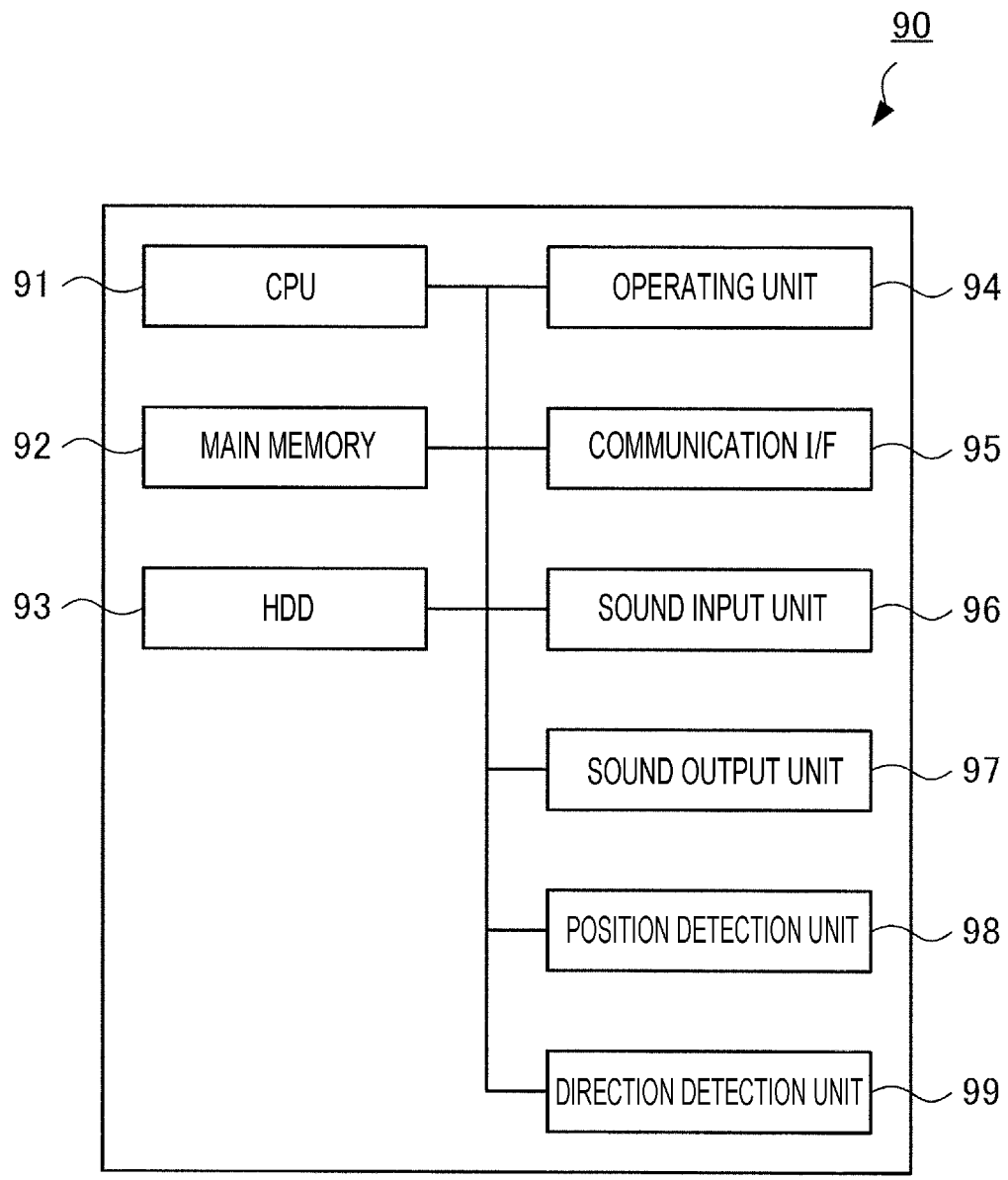
FIG. 19 illustrates an example of a hardware configuration of a terminal apparatus according to any of the first through fourth exemplary embodiments of the present disclosure.

The user position specifying unit 11 specifies a position (user position) of a user wearing the terminal apparatus 10 on the basis of a position of the terminal apparatus 10 detected by a position detection unit 98 (see FIG. 19). For example, the position of the terminal apparatus 10 detected by the position detection unit 98 (see FIG. 19) is used as the user position.

The user direction specifying unit 12 specifies a direction which a user wearing the terminal apparatus 10 faces on the basis of a direction of the terminal apparatus 10 detected by a direction detection unit 99 (see FIG. 19).

The transmitting unit 13 transmits, to the server 20, identification information (hereinafter referred to as a "user ID") of the user wearing the terminal apparatus 10 and the user position specified by the user position specifying unit 11. The user ID need just be stored in the terminal apparatus 10 before the user starts using the terminal apparatus 10. Alternatively, identification information of the apparatus stored in advance in the terminal apparatus 10 may be used as the user ID.

The receiving unit 14 receives sightseeing spot guide information from the server 20. The sightseeing spot guide information varies depending on a sightseeing spot and the number of visits. In the present exemplary embodiment, the receiving unit 14 is provided as a changing unit that changes target information in accordance with history information concerning a user's action.

The information output unit 15 supplies the sightseeing spot guide information received by the receiving unit 14 to the user. Hereinafter, it is assumed that the sightseeing spot guide information is output as voice through a sound output unit 97 (see FIG. 19) although a way in which the sightseeing spot guide information is output is not limited to this. The information output unit 15 outputs the sightseeing spot guide information through a sound output unit 97 (hereinafter referred to as an "sound output unit for left ear") that outputs sound to a left ear in a case where the sightseeing spot is close to the left ear and outputs the sightseeing spot guide information through an sound output unit 97 (hereinafter referred to as an "sound output unit for right ear") that outputs sound to a right ear in a case where the sightseeing spot is close to the right ear. In the present exemplary embodiment, the information output unit 15 is provided as an example of an offering unit that offers target information to a user and as an example of a controller that controls how the target information is offered in accordance with a relationship between a direction which the user is facing and a position of a target.

Next, a functional configuration of the server 20 is described. The server 20 includes a receiving unit 21, an information storage unit 22, an information acquisition unit 23, and a transmitting unit 24.

The receiving unit 21 receives a user ID and a user position from the terminal apparatus 10.

The information storage unit 22 stores therein information (hereinafter referred to as "sightseeing spot information") concerning a sightseeing spot and history information (hereinafter referred to as "position history information") concerning a past user position. Specific contents of the sightseeing spot information and the position history information will be described later. The position history information is an example of history information concerning a user's action, especially an example of visit history information indicative of a history of a user's visit to a specific place and visit history information indicative of the number of user's visits to a specific place.

The information acquisition unit 23 specifies a sightseeing spot close to the user position received by the receiving unit 21 while referring to the sightseeing spot information stored in the information storage unit 22 and specifies the number of visits to this sightseeing spot on the basis of a user position history corresponding to the user ID received by the receiving unit 21 while referring to the position history information stored in the information storage unit 22. Then, the information acquisition unit 23 acquires sightseeing spot guide information corresponding to the sightseeing spot and the number of visits thus specified while referring to the sightseeing spot information stored in the information storage unit 22.

The transmitting unit 24 transmits the sightseeing spot guide information acquired by the information acquisition unit 23 to the terminal apparatus 10.

FIG. 3 illustrates an example of the sightseeing spot information stored in the information storage unit 22. As illustrated in FIG. 3, the sightseeing spot information is information in which a sightseeing spot ID, a sightseeing spot position, the number of visits to a sightseeing spot, and sightseeing spot guide information are associated.

The sightseeing spot ID is identification information of a sightseeing spot.

The sightseeing spot position is a position of a sightseeing spot identified by a corresponding sightseeing spot ID. In this example, the sightseeing spot position is indicated by a coordinate on an XY coordinate system illustrated in FIG. 1.

The number of visits to a sightseeing spot is the number of visits to a sightseeing spot identified by a corresponding sightseeing spot ID.

The sightseeing spot guide information is guide information concerning a sightseeing spot identified by a corresponding sightseeing spot ID. Although pieces of sightseeing spot guide information are indicated by symbols in this example, for example, sightseeing spot guide information M_P1_1 may be basic guide information concerning the sightseeing spot P1, sightseeing spot guide information M_P1_2 may be detailed guide information concerning the sightseeing spot P1, sightseeing spot guide information M_P1_3 may be more detailed guide information concerning the sightseeing spot P1, and the sightseeing spot guide information M_P1_4 may be guide information including surrounding information concerning the sightseeing spot P1.

For example, the sightseeing spot information illustrated in FIG. 3 indicates that the sightseeing spot P1 is located at a coordinate (XP1, YP1) on the XY coordinate system of FIG. 1. Furthermore, the sightseeing spot information illustrated in FIG. 3 indicates that the sightseeing spot guide information M_P1_1 is acquired at the first visit to the sightseeing spot P1, the sightseeing spot guide information M_P1_2 is acquired at the second visit to the sightseeing spot P1, the sightseeing spot guide information M_P1_3 is acquired at the third visit to the sightseeing spot P1, and the sightseeing spot guide information M_P1_4 is acquired at the fourth or subsequent visit to the sightseeing spot P1.

FIG. 4 illustrates an example of the position history information stored in the information storage unit 22. As illustrated in FIG. 4, the position history information is information in which a user ID and a user position history are associated.

The user ID is identification information of a user.

The user position history is a history of positions of places visited in the past by a user identified by a corresponding user ID. It is assumed that information (not illustrated) on date and time of a user's visit to a place is stored in association with each of user positions.

For example, the position history information illustrated in FIG. 4 indicates that a user A visited places indicated by coordinates (XA1, YA1), (XA2, YA2), (XA3, YA3), (XA4, YA4), and (XA5, YA5) on the XY coordinate system of FIG. 1 at past points in time in this order.

Figure 5:
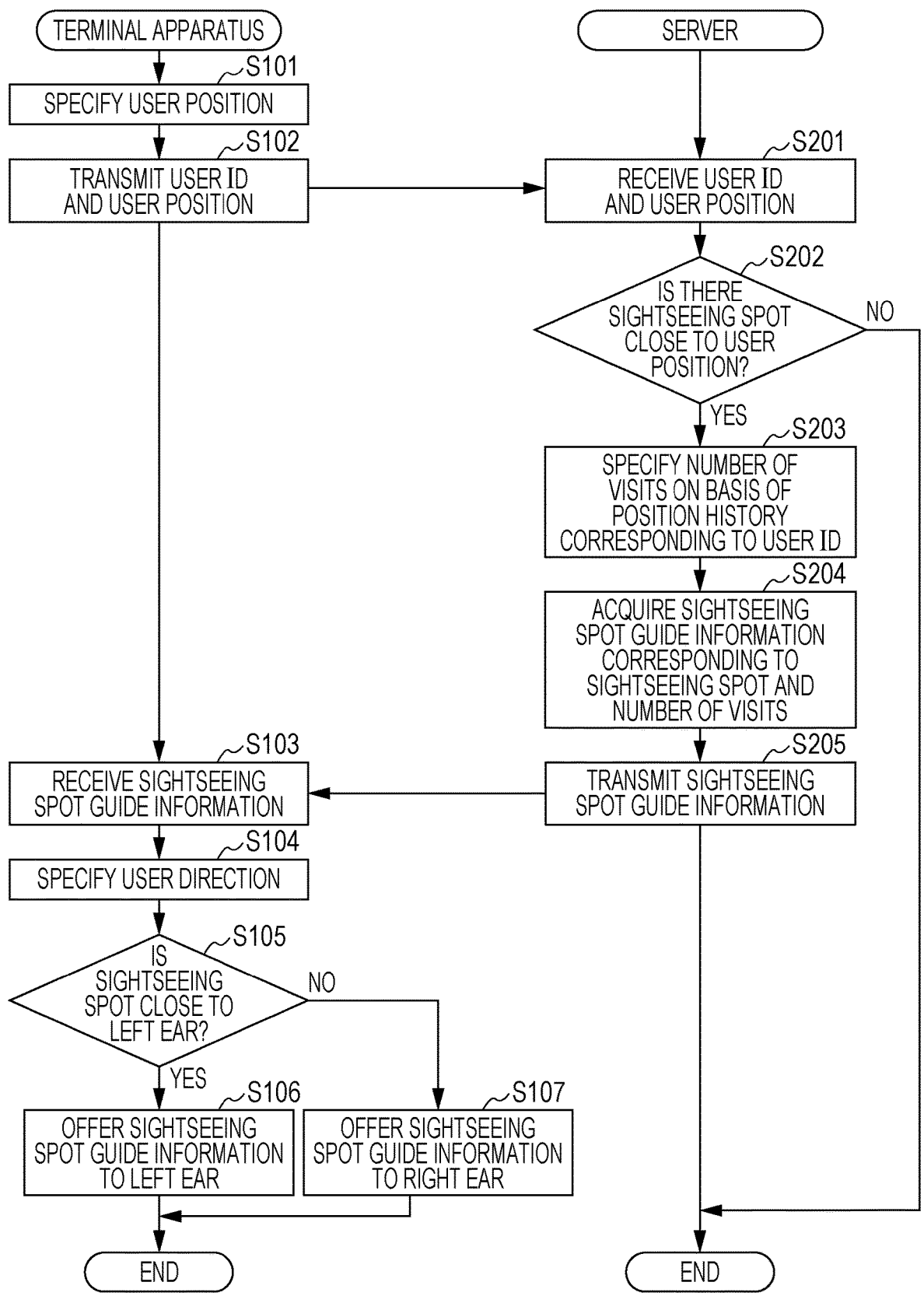
FIG. 5 is a sequence diagram illustrating an example of operation of the computer system according to the first exemplary embodiment of the present disclosure.

FIG. 5 is a sequence diagram illustrating an example of operation of the computer system 1 according to the first exemplary embodiment.

As illustrated in FIG. 5, in the terminal apparatus 10, first, the user position specifying unit 11 specifies a user position (Step 101).

Then, the transmitting unit 13 transmits a user ID and the user position specified in Step 101 to the server 20 (Step 102).

In the server 20, the receiving unit 21 receives the user ID and the user position transmitted in Step 102 (Step 201).

Then, the information acquisition unit 23 determines whether or not there is a sightseeing spot close to the user position received in Step 201 while referring to the sightseeing spot information stored in the information storage unit 22 (Step 202). This determining process need just be performed, for example, by examining whether or not there is a sightseeing spot whose position is included in a circle of a predetermined radius around the user position received in Step 201.

In a case where it is determined as a result of the determining process that there is no sightseeing spot close to the user position, the process is finished. Meanwhile, in a case where it is determined that there is a sightseeing spot close to the user position, the information acquisition unit 23 specifies the sightseeing spot. That is, the information acquisition unit 23 specifies a sightseeing spot ID of the sightseeing spot. Then, the information acquisition unit 23 specifies the number of visits to the sightseeing spot specified in Step 202 as the number of visits to the sightseeing spot on the basis of a user position history corresponding to the user ID received in Step 201 while referring to the position history information stored in the information storage unit 22 (Step 203). For example, the information acquisition unit 23 need just count the number of user positions present within a predetermined radius around a sightseeing spot position corresponding to the sightseeing spot ID specified in Step 202 among user positions stored as a history for the user ID received in Step 201 and use the number of user positions as the number of visits. Note, however, that in a case where such user positions are consecutive in the history, the consecutive user positions are collectively counted as one user position. Furthermore, in a case where the history includes plural such user positions on the same date, these user positions may be collectively counted as one user position.

After the sightseeing spot is specified in Step 202 and the number of visits is specified in Step 203, the information acquisition unit 23 acquires sightseeing spot guide information corresponding to the sightseeing spot and the number of visits thus specified from the sightseeing spot information stored in the information storage unit 22 (Step 204). Specifically, the information acquisition unit 23 acquires sightseeing spot guide information that corresponds to the sightseeing spot ID specified in Step 202 and corresponds to the number of visits to the sightseeing spot specified in Step 203 from the sightseeing spot information stored in the information storage unit 22.

Then, the transmitting unit 24 transmits the sightseeing spot guide information acquired in Step 204 to the terminal apparatus 10 (Step 205).

In the terminal apparatus 10, the receiving unit 14 receives the sightseeing spot guide information transmitted in Step 205 (Step 103).

Then, the user direction specifying unit 12 specifies a user direction (Step 104).

Then, the information output unit 15 determines whether or not the sightseeing spot is close to a left ear on the basis of the user position specified in Step 101 and the user direction specified in Step 104 (Step 105). In a case where it is determined that the sightseeing spot is close to the left ear, the information output unit 15 offers the sightseeing spot guide information to the user's left ear through the sound output unit for left ear 97 (Step 106). In a case where it is determined that the sightseeing spot is not close to the left ear, i.e., in a case where it is determined that the sightseeing spot is close to the right ear, the information output unit 15 offers the sightseeing spot guide information to the user's right ear through the sound output unit for right ear 97 (Step 107).

In the above example, one of the sound output unit for left ear 97 and the sound output unit for right ear 97 outputs a sound, and the other one of the sound output unit for left ear 97 and the sound output unit for right ear 97 does not output sound. This is an example in which in a case where a target is present on a first side with respect to a direction which a user is facing, an offering unit is controlled so that target information is offered to a user's auditory organ on the first side and is not offered to a user's auditory organ on a second side.

However, a mode of sound output from the sound output unit for left ear 97 and the sound output unit for right ear 97 is not limited to this. It is also possible to employ an arrangement in which both of the sound output unit for left ear 97 and the sound output unit for right ear 97 output sound but in different sound volumes in accordance with distances from the sightseeing spot to the left ear and the right ear. For example, one of the sound output unit for left ear 97 and the sound output unit for right ear 97 that is closer to the sightseeing spot may output sound in a larger sound volume than the other one of the sound output unit for left ear 97 and the sound output unit for right ear 97 that is farther away from the sightseeing spot. This is an example in which in a case where a target is present on a first side with respect to a direction which a user is facing, an offering unit is controlled so that target information is offered to a user's auditory organ on the first side in a first sound volume and is offered to a user's auditory organ on a second side in a second sound volume smaller than the first sound volume.

In a case where the distance from the sightseeing spot to the left ear and the distance from the sightseeing spot to the right ear are similar, the information output unit 15 may offer sightseeing spot guide information to both of the ears. In this case, sound may be output in a larger sound volume in a case where the user is facing the sightseeing spot and where the distance from the sightseeing spot to the left ear and the distance from the sightseeing spot to the right ear are similar than in a case where the user is facing opposite to the sightseeing spot and where the distance from the sightseeing spot to the left ear and the distance from the sightseeing spot to the right ear are similar.

Although various modes of sound output from the sound output unit for left ear 97 and the sound output unit for right ear 97 have been described above, it can be said that all of these modes are examples in which how target information is offered by the offering unit is controlled in accordance with on which of a first side and a second side a target is present with respect to a direction which a user is facing.

The process in Step 105 for determining whether or not the sightseeing spot is close to a left ear is described below. As a method for determining whether or not the sightseeing spot is close to a left ear, it is possible to find a distance from the sightseeing spot to the left ear and a distance from the sightseeing spot to the right ear and determine whether or not the sightseeing spot is close to the left ear in accordance with a relationship between these distances. However, the following describes a method for determining whether or not a sightseeing spot is close to a left ear by determining on which of a left side and a right side the sightseeing spot is present with respect to a direction which a user is facing.

Figure 6:
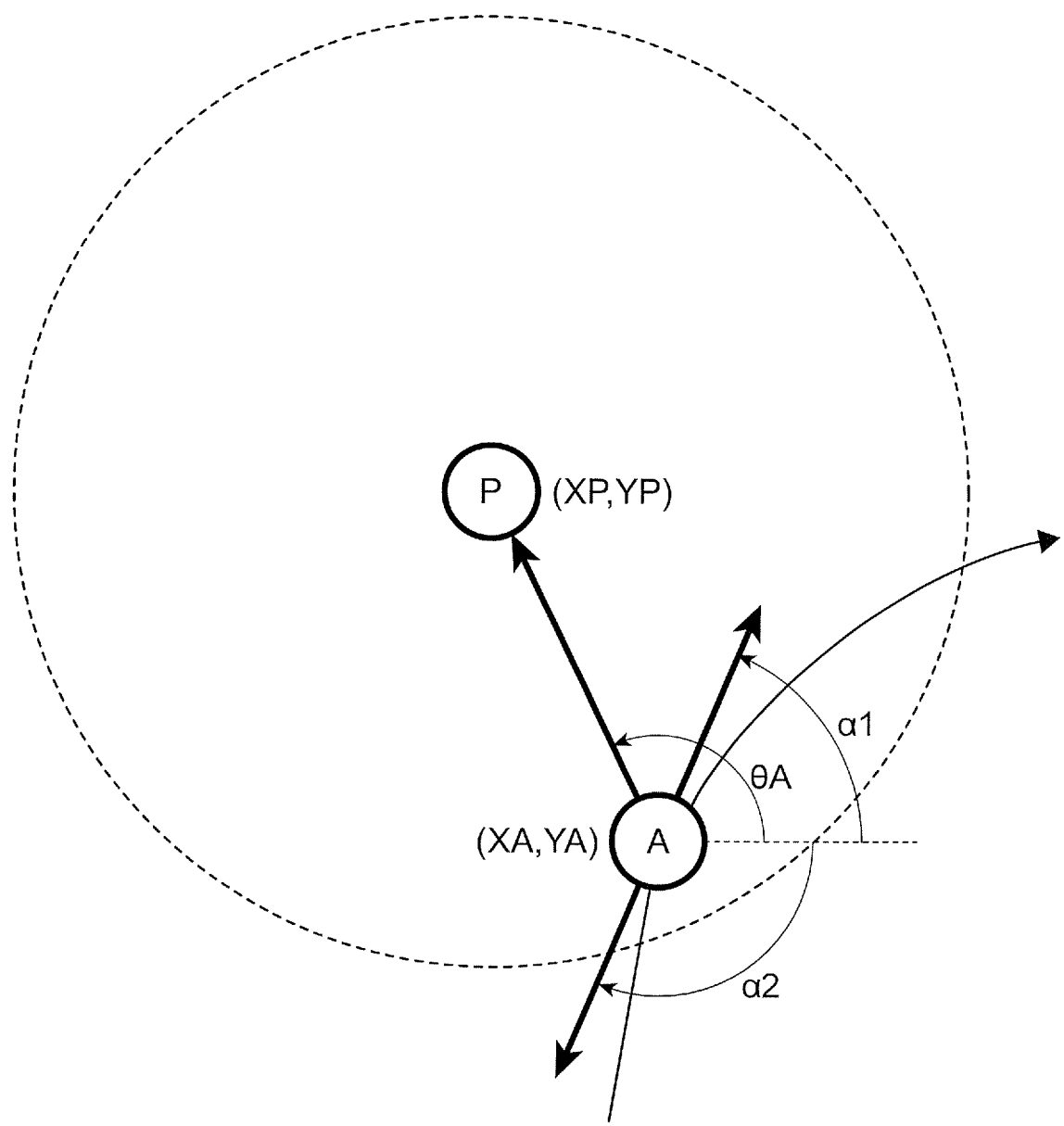
FIG. 6 is a view for explaining a method for determining whether or not a sightseeing spot is close to a left ear.

FIG. 6 is a view for explaining this determining method. Coordinates in FIG. 6 are also expressed on the XY coordinate system of FIG. 1. A direction in FIG. 6 is expressed by an angle from a positive direction of an X-axis. Specifically, a direction rotated in a counterclockwise direction by an angle of 180° or less from the positive direction of the X-axis is expressed as a positive angle, and a direction rotated in a clockwise direction by an angle of 180° or less from the positive direction of the X-axis is expressed as a negative angle. Furthermore, an angle obtained by calculation is normalized to not less than −180° and not more than 180° by adding or subtracting 360°.

It is assumed that a sightseeing spot P is located at a coordinate (XP, YP), as illustrated in FIG. 6. It is assumed that a user A is present at a coordinate (XA, YA) and that a direction from the user A to the sightseeing spot P is θA (90°<θA<180°). θA is calculated from the coordinate (XP, YP) and the coordinate (XA, YA). Assume here that the user A is facing a direction α1 (0°<α1<90°). This is a case where it should be determined that the sightseeing spot P is close to the left ear of the user A. In this case, θA and α1 meet 0°<θA−α1<180° because of the above restrictions of the ranges. Meanwhile, assume that the user A is facing a direction α2 (−180°<α2<−90°). This is a case where it should be determined that the sightseeing spot P is close to the right ear of the user A. In this case, θA and α2 meet 180°<θA−α2<360° because of the above restrictions of the ranges and meet −180°<θA−α2<0° by normalization of subtracting 360°.

This shows that at any position around the sightseeing spot P, it should be determined that the sightseeing spot P is close to the left ear of the user A in a case where an angle (θA−α) formed between the direction θA from the user A to the sightseeing spot P and the direction α which the user A is facing meets 0°<θA−α<180°, and it should be determined that the sightseeing spot P is close to the right ear of the user A in a case where the angle (θA−α) meets −180°<θA−α<0°.

Although a case where θA−α is −180°, 0°, or 180° has not been described, it need just be determined, in this case, that a distance from the sightseeing spot P to the left ear of the user A and a distance from the sightseeing spot P to the right ear of the user A are almost equal. In addition to the case where θA−α is −180°, 0°, or 180°, it is also possible to set a range in which it should be determined that a distance from the sightseeing spot P to the left ear of the user A and a distance from the sightseeing spot P to the right ear of the user A are almost equal. For example, it is also possible to set a relatively small angle δ in advance and determine that a distance from the sightseeing spot P to the left ear of the user A and a distance from the sightseeing spot P to the right ear of the user A are almost equal in a case where θA−α<−180°+δ, −δ<θA−α<δ, or θA−α>180°−δ is met.

Furthermore, a case where θA−α is 0° and a case where θA−α is −180° or 180° may be different. Specifically, in a case where θA−α is 0°, it may be determined that the user A is facing the sightseeing spot P and a distance from the sightseeing spot P to the left ear of the user A and a distance from the sightseeing spot P to the right ear of the user A are almost equal, whereas in a case where θA−α is −180° or 180°, it may be determined that the user A is facing opposite to the sightseeing spot P and a distance from the sightseeing spot P to the left ear of the user A and a distance from the sightseeing spot P to the right ear of the user A are almost equal. Furthermore, in a case where −δ<θA−α<δ is met, it may be determined that the user A is facing the sightseeing spot P and a distance from the sightseeing spot P to the left ear of the user A and a distance from the sightseeing spot P to the right ear of the user A are almost equal, whereas in a case where θA−α<−180°+δ or θA−α>180°−δ are met, it may be determined that the user A is facing opposite to the sightseeing spot P and a distance from the sightseeing spot P to the left ear of the user A and a distance from the sightseeing spot P to the right ear of the user A are almost equal.

Second Exemplary Embodiment

The present exemplary embodiment is an exemplary embodiment for a case in which a security guard (user) wearing a terminal apparatus patrols in an office building. An office building generally has a central control room, information such as a status of use of indoor electric power, employee entering and leaving information, and information on a prior notification of an all-night operating apparatus is managed in this central control room, and check points during patrolling are set on the basis of these pieces of information. In the present exemplary embodiment, the terminal apparatus offers check guide information concerning the check points to the security guard. The check points are an example of a facility checked by a user, and the check guide information is an example of instruction information concerning items to be checked of the facility.

Figure 7:
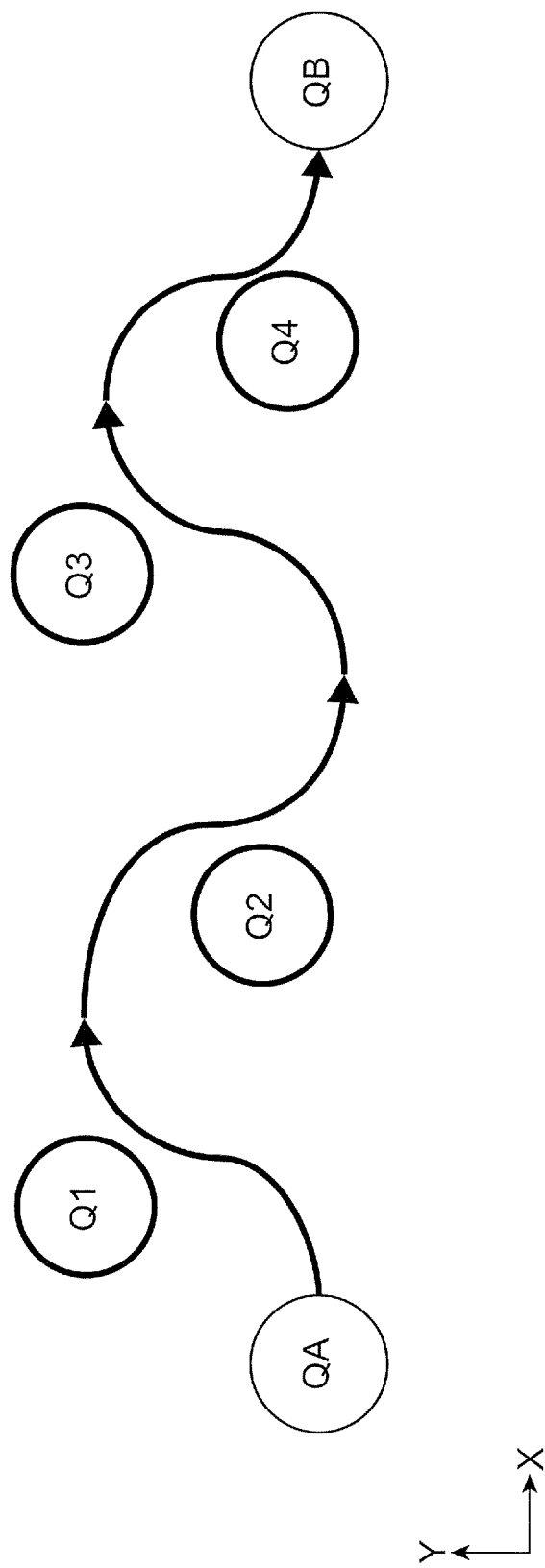
FIG. 7 illustrates an example of a route of patrol according to a second exemplary embodiment of the present disclosure.

FIG. 7 illustrates an example of a route of such patrol. It is assumed that check points Q1, Q2, Q3, and Q4 during patrol are present between a point QA and a point QB, as illustrated in FIG. 7. A route of patrolling in the order of the check points Q1, Q2, Q3, and Q4 is indicated by the arrows. For example, it is assumed that the security guard patrols along the route from the point QA to the point QB four times in one day. It is assumed that the first patrol is performed at 20 o'clock, the second patrol is performed at 23 o'clock, the third patrol is performed at 2 o'clock, and the fourth patrol is performed at 5 o'clock.

The security guard, for example, checks whether or not a light is off, whether or not a lock is closed, and whether or not there is a remaining person and checks an all-night operating apparatus (e.g., checks whether or not the all-night operating apparatus is normally operating, generation of smoke, and generation of fire) at the check points Q1, Q2, Q3, and Q4, but items to be checked vary depending on how many times the patrol has been performed on the date (what time the patrol is performed).

For example, assume that it can be estimated from history information obtained during past patrol of the security guard wearing the terminal apparatus that business is in operation at the check points Q2, Q3, and Q4 at 20 o'clock and that an all-night operating apparatus is provided only at the check point Q4. In this case, at 20 o'clock, the security guard need just check whether or not a light is off and whether or not a lock is closed at the check point Q1, check whether or not there is a remaining person at the check points Q2, Q3, and Q4, and further check the all-night operating apparatus at the check point Q4.

Furthermore, assume that it can be estimated from history information obtained during past patrol of the security guard wearing the terminal apparatus that business is in operation only at the check point Q4 at 23 o'clock. In this case, at 23 o'clock, the security guard need just check whether or not a light is off and whether or not a lock is closed at the check points Q1, Q2, and Q3 and check whether or not there is a remaining person and check the all-night operating apparatus at the check point Q4.

Furthermore, assume that it can be estimated from history information obtained during past patrol of the security guard wearing the terminal apparatus that no employee is present at the check points Q1, Q2, Q3, and Q4 at 2 o'clock and 5 o'clock. In this case, at 2 o'clock and 5 o'clock, the security guard need just check whether or not a light is off and whether or not a lock is closed at the check points Q1, Q2, Q3, and Q4 and further check the all-night operating apparatus at the check point Q4.

That is, in the present exemplary embodiment, the terminal apparatus has a position detection unit that detects a position of the security guard and reproduces audio check guide information corresponding to the position of the security guard detected by the position detection unit and the number of visits to the position. The terminal apparatus guides the security guard to a check point on the basis of balance between voice emitted to a left ear and voice emitted to a right ear.

In addition, the terminal apparatus has a microphone. When the security guard utters a check result of patrol toward the microphone, the terminal apparatus transmits the check result of patrol to a server on a cloud together with a time and a position, and these pieces of information are recorded on the cloud.

Figure 8:
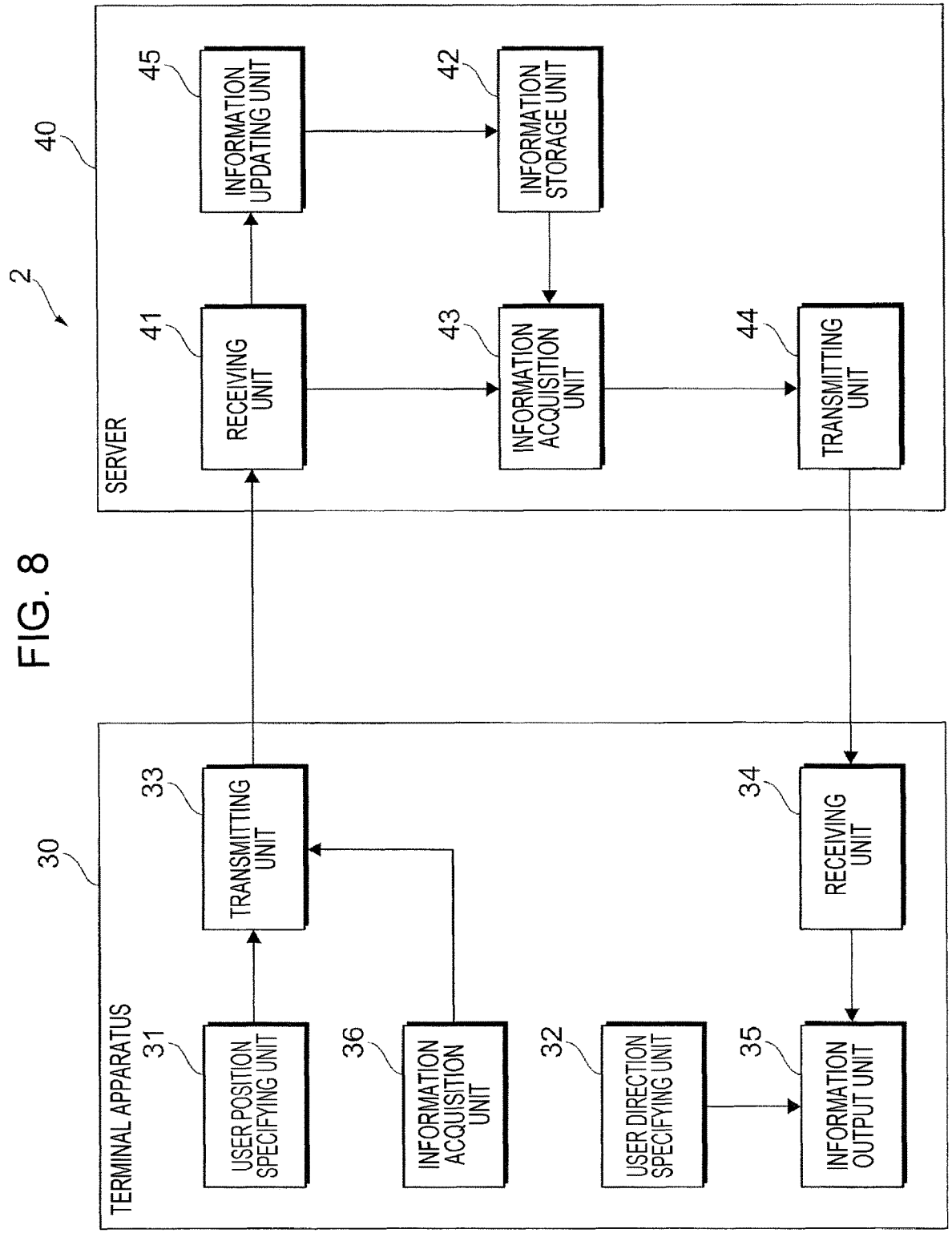
FIG. 8 is a block diagram illustrating an example of a functional configuration of a computer system according to the second exemplary embodiment of the present disclosure.

FIG. 8 is a block diagram illustrating an example of a functional configuration of a computer system 2 according to the second exemplary embodiment. As illustrated in FIG. 8, the computer system 2 according to the second exemplary embodiment is constituted by a terminal apparatus 30 that is an example of an information offering apparatus and a server 40 that is an example of a transmitting apparatus, and the terminal apparatus 30 and the server 40 are connected through a communication line.

First, a functional configuration of the terminal apparatus 30 is described. The terminal apparatus 30 includes a user position specifying unit 31, a user direction specifying unit 32, a transmitting unit 33, a receiving unit 34, an information output unit 35, and an information acquisition unit 36.

The user position specifying unit 31 and the user direction specifying unit 32 are identical to the user position specifying unit 11 and the user direction specifying unit 12 according to the first exemplary embodiment, and therefore description thereof is omitted.

The transmitting unit 33 transmits a user ID and a user position specified by the user position specifying unit 31 to the server 20. The user ID has been described in the first exemplary embodiment, and therefore description thereof is omitted. In the second exemplary embodiment, information (hereinafter also referred to as "check result information") on a result of check by a security guard at a check point is also transmitted to the server 20.

The receiving unit 34 receives check guide information from the server 20. The check guide information varies depending on a check point and the number of visits. In the present exemplary embodiment, the receiving unit 34 is provided as an example of a changing unit that changes target information in accordance with history information concerning a user's action.

The information output unit 35 supplies the check guide information received by the receiving unit 34 to the user. Hereinafter, it is assumed that the check guide information is output as voice through a sound output unit 97 (see FIG. 19) although a way in which the check guide information is output is not limited to this. The information output unit 35 outputs the check guide information through a sound output unit for left ear 97 in a case where the check point is close to the left ear and outputs the check guide information through a sound output unit for right ear 97 in a case where the check point is close to the right ear. In the present exemplary embodiment, the information output unit 35 is provided as an example of an offering unit that offers target information to a user and as an example of a controller that control how the target information is offered in accordance with a relationship between a direction which the user is facing and a position of a target.

The information acquisition unit 36 acquires check result information input as voice by the security guard by using a sound input unit 96 (see FIG. 19). In the present exemplary embodiment, the information acquisition unit 36 is provided as an example of an acquisition unit that acquires user's voice indicative of items to be checked of a facility.

Next, a functional configuration of the server 40 is described. The server 40 includes a receiving unit 41, an information storage unit 42, an information acquisition unit 43, a transmitting unit 44, and an information updating unit 45.

The receiving unit 41 receives a user ID and a user position from the terminal apparatus 30. In the second exemplary embodiment, the receiving unit 41 also receives check result information from the terminal apparatus 30.

The information storage unit 42 stores therein information (hereinafter referred to as "check point information") concerning a check point and history information (position history information) concerning a past user position. Specific contents of the check point information will be described later. Specific contents of the position history information have been described in the first exemplary embodiment, and therefore description thereof is omitted. However, in the present exemplary embodiment, a situation in which a check point is visited for a purpose different from checking can also be assumed. In view of such a situation, it is also possible to prevent position history information from influencing acquired check guide information in such a case by setting the terminal apparatus 30 to a patrolling mode only in a case where a check point is visited for checking and recording position history information only in a case where the terminal apparatus 30 is set to the patrolling mode. In this case, the position history information is an example of visit history information indicative of a history of a visit for a user's action to a specific place.

The information acquisition unit 43 specifies a check point close to the user position received by the receiving unit 41 while referring to the check point information stored in the information storage unit 42 and specifies the number of visits to the check point on the basis of a user position history corresponding to the user ID received by the receiving unit 41 while referring to the position history information stored in the information storage unit 42. Then, the information acquisition unit 43 acquires check guide information corresponding to the check point and the number of visits thus specified while referring to the check point information stored in the information storage unit 42.

The transmitting unit 44 transmits the check point information acquired by the information acquisition unit 43 to the terminal apparatus 30.

The information updating unit 45 updates check guide information included in the check point information stored in the information storage unit 42 on the basis of the check result information received by the receiving unit 41. In the present exemplary embodiment, the information updating unit 45 is provided as an example of an updating unit that updates a history of an item of a facility checked in the past.

FIG. 9 illustrates an example of the check point information stored in the information storage unit 42. As illustrated in FIG. 9, the check point information is information in which a check point ID, a check point position, the number of visits to a check point, and check guide information are associated.

The check point ID is identification information of a check point.

The check point position is a position of a check point identified by a corresponding check point ID. In this example, the check point position is indicated by a coordinate on an XY coordinate system illustrated in FIG. 7.

The number of visits to a check point is the number of visits to a check point identified by a corresponding check point ID.

The check guide information is guide information indicative of an item to be checked at a check point identified by a corresponding check point ID. Although check guide information is indicated by symbols, for example, check guide information M_Q1_1 may be guide information for checking at the check point Q1 at 20 o'clock, check guide information M_Q1_2 may be guide information for checking at the check point Q1 at 23 o'clock, check guide information M_Q1_3 may be guide information for checking at the check point Q1 at 2 o'clock, and check guide information M_Q1_4 may be guide information for checking at the check point Q1 at 5 o'clock. These pieces of check guide information are determined from history information obtained during past patrol of the security guard wearing the terminal apparatus 30 as described above. That is, the check guide information is an example of instruction information decided, for each time corresponding to the number of visits to a place to be checked in a facility, on the basis of a history of an item of the facility checked in the past.

For example, the check point information of FIG. 9 indicates that the check point Q1 is located at a coordinate (XQ1, YQ1) on the XY coordinate system of FIG. 7. Furthermore, the check point information of FIG. 9 indicates that the check guide information M_Q1_1 is acquired at the first visit to the check point Q1, the check guide information M_Q1_2 is acquired at the second visit to the check point Q1, the check guide information M_Q1_3 is acquired at the third visit to the check point Q1, and the check guide information M_Q1_4 is acquired at the fourth visit to the check point Q1.

Figure 10:
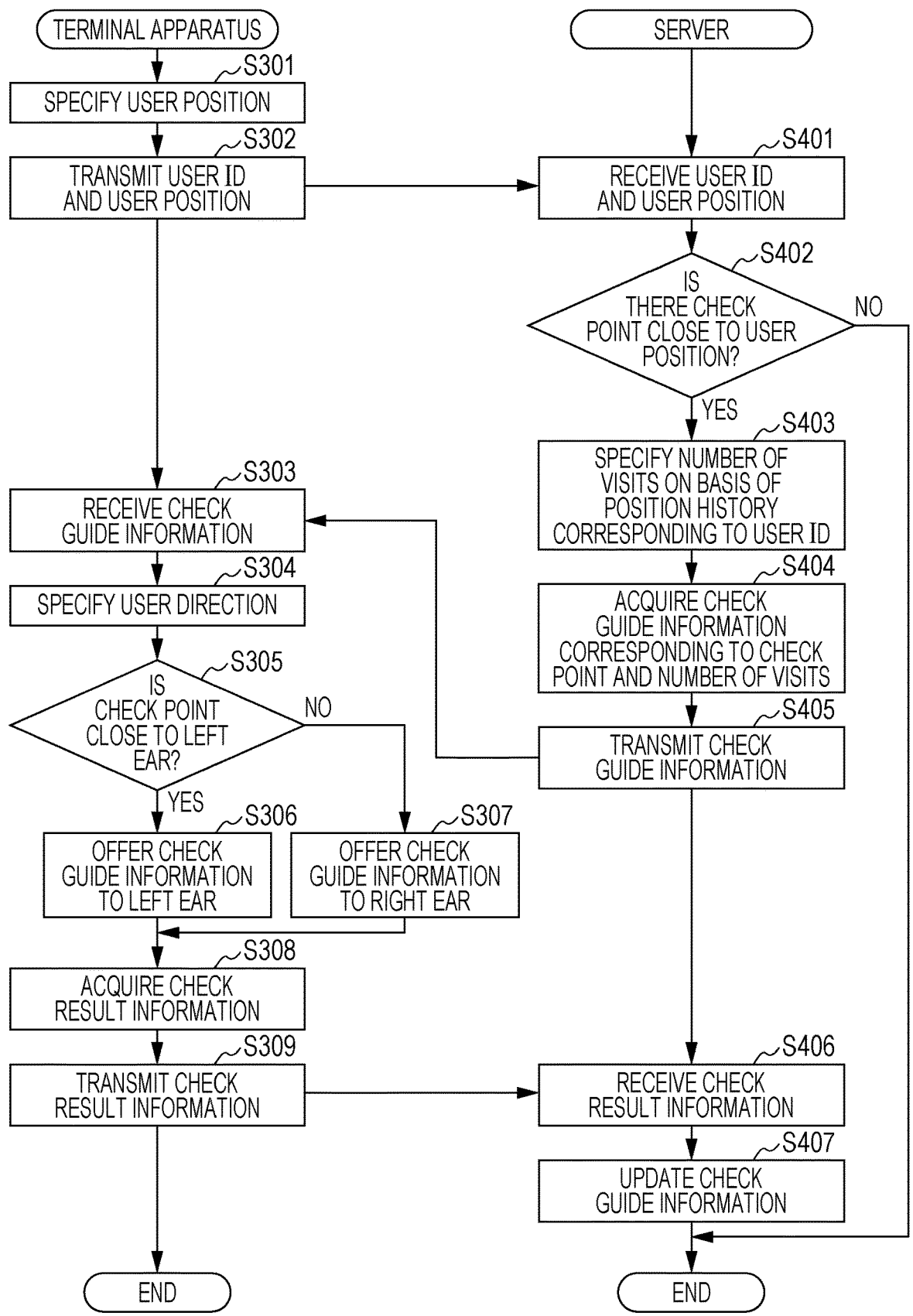
FIG. 10 is a sequence diagram illustrating an example of operation of the computer system according to the second exemplary embodiment of the present disclosure.

FIG. 10 is a sequence diagram illustrating an example of operation of the computer system 2 according to the second exemplary embodiment.

Processes in Steps 301 and 302, Steps 401 through 405, and Steps 303 through 307 are similar to the processes in Steps 101 and 102, Steps 201 through 205, and Steps 103 through 107 in the first exemplary embodiment except for that a check point replaces a sightseeing spot and check guide information replaces sightseeing spot guide information, and therefore description thereof is omitted.

When check guide information is offered to a user in Step 306 and Step 307, the information acquisition unit 36 of the terminal apparatus 30 acquires check result information input through the sound input unit 96 (Step 308).

Then, the transmitting unit 33 transmits the check result information to the server 40 (Step 309).

In the server 40, the receiving unit 41 receives the check result information transmitted in Step 309 (Step 406).

Then, the information updating unit 45 updates check guide information included in the check point information stored in the information storage unit 42 on the basis of the check result information received in Step 406 (Step 407). For example, in a case where information indicating that whether or not a light is off and whether or not a lock is closed should be checked is stored as check guide information for checking at a certain check point at 20 o'clock and where recent patrol found that business is often in operation at the check point, the check guide information is updated to information indicating that whether or not there is a remaining person should be checked.

Third Exemplary Embodiment

The present exemplary embodiment is an exemplary embodiment for a case where a visitor (user) wearing a terminal apparatus appreciates an art object at a museum. In the present exemplary embodiment, the terminal apparatus offers guide information (hereinafter referred to as "art object guide information") concerning an art object to a visitor. The action of appreciating is an example of the action of seeing, the art object is an example of a viewed object which a user sees, and the art object guide information is an example of explanatory information for explaining the viewed object.

An audio guide used in a museum usually provides the same contents repeatedly, and therefore a visitor who has visited the museum plural times does not hear the audio guide in many cases. Furthermore, although a tour route is generally set at a museum, there are art objects, such as sculptures, that can be appreciated from multiple directions, and a visitor sometimes appreciates again an art object that has been appreciated once since the visitor can freely explore the museum.

Figure 11:
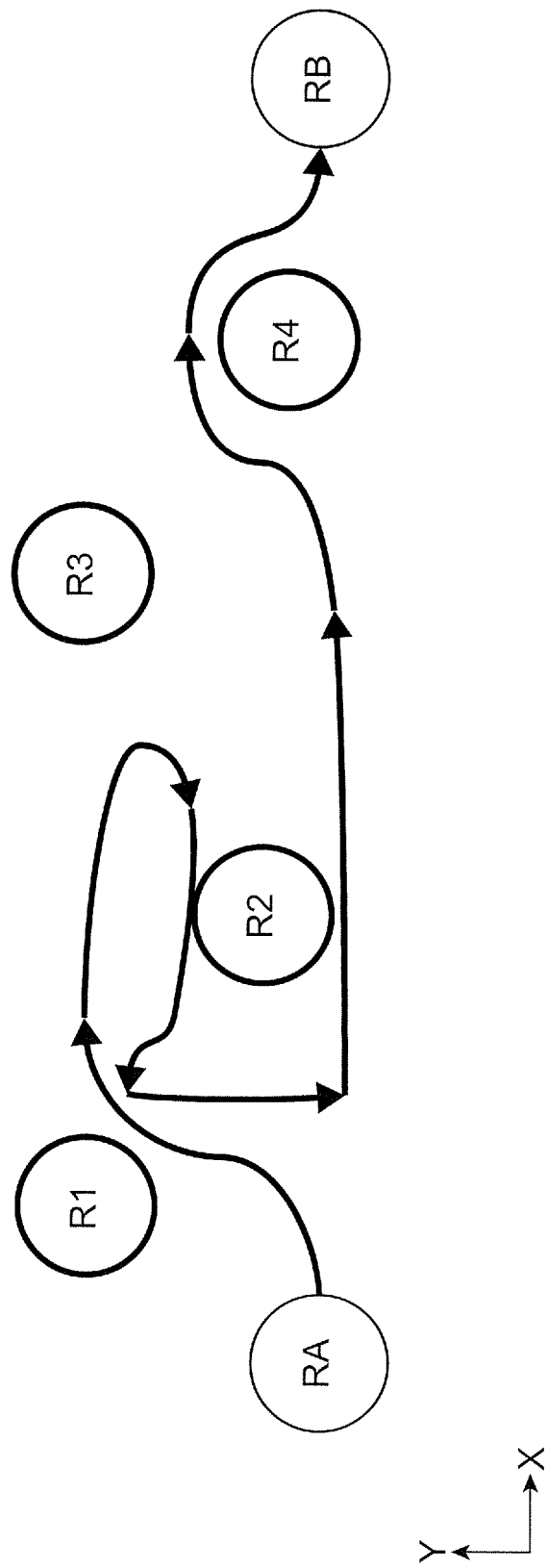
FIG. 11 illustrates an example of a tour route of a museum according to a third exemplary embodiment of the present disclosure.

FIG. 11 illustrates an example of a tour route at such a museum. It is assumed that art objects R1, R2, R3, and R4 are present between a point θA and a point RB, as illustrated in FIG. 11. However, since a visitor can freely explore the museum, a route on which the visitor appreciates an art object R1, appreciates an art object R2, appreciates the art object R1 again, appreciates the art object R2 from a different direction, and finally appreciates an art object R4 is indicated by the arrows.

In view of this, in the present exemplary embodiment, the terminal apparatus changes reproduced contents of an audio guide depending on not only which of the art objects R1, R2, R3, and R4 is being appreciated, but also information such as from which direction the art object is being appreciated and which art object was appreciated before the art object. This allows a visitor to know a direction from which an art object looks attractive, transition of an art style over passage of time, features of plural art objects through comparison, and the like.

Figure 12:
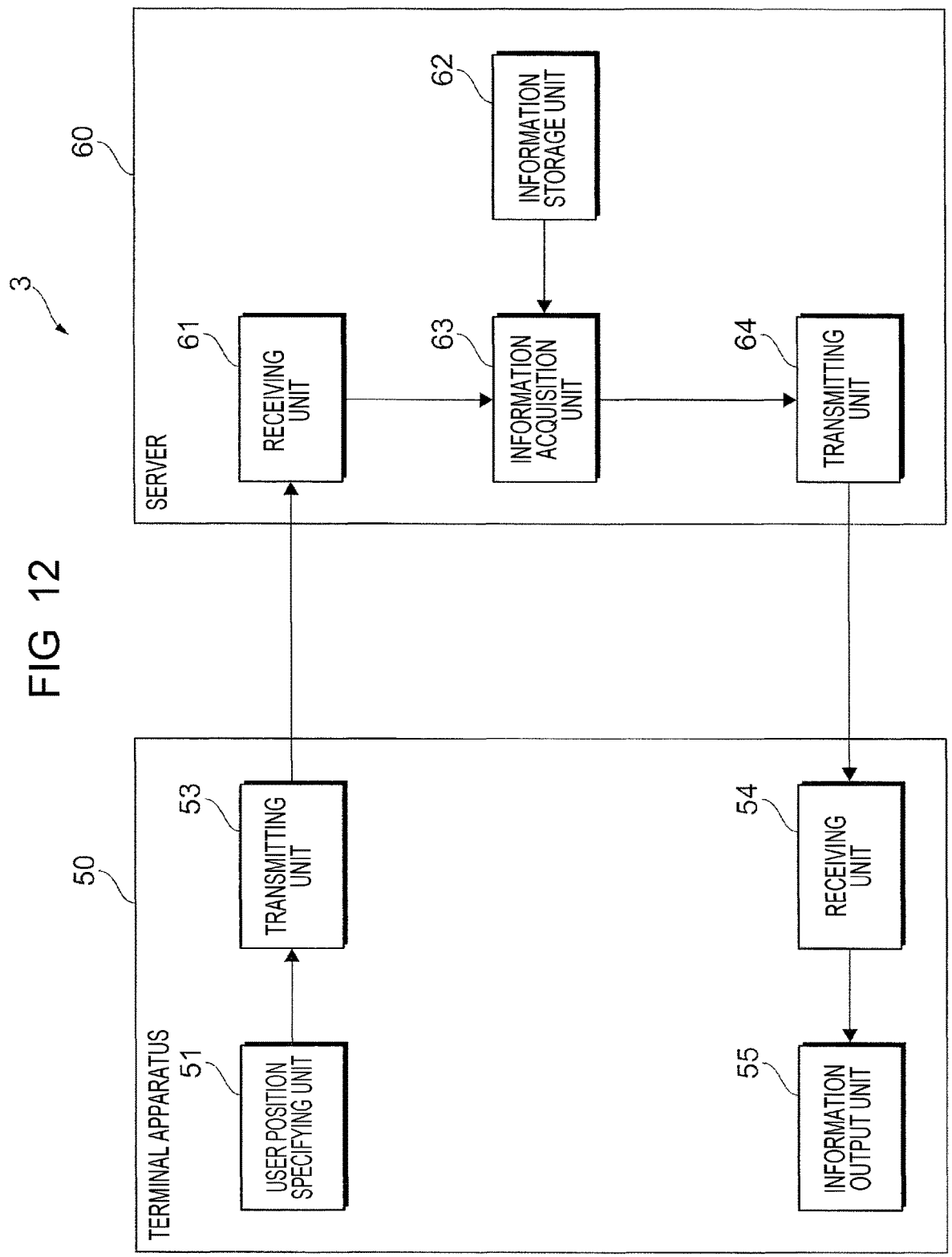
FIG. 12 is a block diagram illustrating an example of a functional configuration of a computer system according to the third exemplary embodiment of the present disclosure.

FIG. 12 is a block diagram illustrating an example of a functional configuration of a computer system 3 according to the third exemplary embodiment. As illustrated in FIG. 12, the computer system 3 according to the third exemplary embodiment is constituted by a terminal apparatus 50 that is an example of an information offering apparatus and a server 60 that is an example of a transmitting apparatus, and the terminal apparatus 50 and the server 60 are connected through a communication line.

First, a functional configuration of the terminal apparatus 50 is described. The terminal apparatus 50 includes a user position specifying unit 51, a transmitting unit 53, a receiving unit 54, and an information output unit 55.

The user position specifying unit 51 and the transmitting unit 53 are identical to the user position specifying unit 11 and the transmitting unit 13 according to the first exemplary embodiment, and therefore description thereof is omitted.

The receiving unit 54 receives art object guide information from the server 60. The art object guide information varies depending on an art object, the number of visits, an appreciation direction, and an art object that has been already appreciated. In the present exemplary embodiment, the receiving unit 54 is provided as an example of a changing unit that changes target information in accordance with history information concerning a user's action, a changing unit that changes explanatory information in accordance with a direction from which a user views a viewed object, and a changing unit that changes explanatory information in accordance with a viewed object viewed by a user before the viewed object that is currently viewed among plural viewed objects. Alternatively, the art object that has been already viewed may be an order in which art objects were appreciated before an art object that is currently being appreciated. In this case, the receiving unit 54 is an example of a changing unit that changes explanatory information in accordance with an order in which the user has seen a plurality of viewed objects including the viewed object.

The information output unit 55 supplies art object guide information received by the receiving unit 54 to a user. Hereinafter, it is assumed that the art object guide information is output as voice through a sound output unit (see FIG. 19) although a way in which the art object guide information is output is not limited to this. In the present exemplary embodiment, the information output unit 55 is provided as an example of an offering unit that offers target information to a user.

Next, a functional configuration of the server 60 is described. The server 60 includes a receiving unit 61, an information storage unit 62, an information acquisition unit 63, and a transmitting unit 64.

The receiving unit 61 receives a user ID and a user position from the terminal apparatus 50.

The information storage unit 62 stores therein information (hereinafter referred to as "art object information") concerning an art object and history information (position history information) concerning a past user position. Specific contents of the art object information will be described later. Specific contents of the position history information have been described in the first exemplary embodiment, and therefore description thereof is omitted.

The information acquisition unit 63 specifies an art object close to the user position received by the receiving unit 61 while referring to the art object information stored in the information storage unit 62 and specifies an appreciation direction on the basis of the user position and a position of the art object. Furthermore, the information acquisition unit 63 specifies the number of visits to this art object and an art object that has been already appreciated on the basis of a user position history corresponding to the user ID received by the receiving unit 61 while referring to the position history information stored in the information storage unit 62. Then, the information acquisition unit 63 acquires art object guide information that corresponds to the art object, the number of visits, the appreciation direction, and the art object that has been already appreciated thus specified while referring to the art object information stored in the information storage unit 62. Alternatively, the art object that has been already appreciated may be an order in which art objects were appreciated before an art object that is currently being appreciated.

The transmitting unit 64 transmits the art object guide information acquired by the information acquisition unit 63 to the terminal apparatus 50.

FIG. 13 illustrates an example of the art object information stored in the information storage unit 62. As illustrated in FIG. 13, the art object information is information in which an art object ID, an art object position, the number of visits to an art object, an art object appreciation direction, appreciated art object ID, and art object guide information are associated.

The art object ID is identification information of an art object.

The art object position is a position of an art object identified by a corresponding art object ID. In this example, the art object position is indicated by a coordinate on an XY coordinate system illustrated in FIG. 11.

The number of visits to an art object is the number of visits to a place where an art object identified by a corresponding art object ID is exhibited.

The art object appreciation direction is a direction from which an art object identified by a corresponding art object ID is appreciated. Although it is actually desirable that directions (e.g., a direction toward a front side of the art object, a direction toward a left side of the art object, and a direction toward a right side of the art object) relative to the art object be used, it is assumed that directions $\theta1$, $\theta2$, $\theta3$, and $\theta4$ common to all art objects are used for simplification of description. The term "any" indicates that an art object may be appreciated from any direction.

The appreciated art object ID is identification information of an art object that has been already appreciated before an art object identified by a corresponding art object ID. The term "other" indicates that an art object other than an art object listed above has been already appreciated or that any of the art objects has not been appreciated yet. Furthermore, the term "any" indicates that any art objects may have been already appreciated and that any art objects may have not been appreciated yet.

The art object guide information is guide information concerning an art object identified by a corresponding art object ID. Although the art object guide information is indicated by symbols, for example, art object guide information M_R1_100 may be basic guide information concerning an art object R1, and art object guide information M_R1_200 may be detailed guide information concerning the art object R1.

For example, the art object information illustrated in FIG. 12 indicates that the art object R1 is located at a coordinate (XR1, YR1) on the XY coordinate system illustrated in FIG. 1. Furthermore, the art object information illustrated in FIG. 12 indicates that the art object guide information M_R1_100 is acquired at the first visit to a place where the art object R1 is exhibited and that the art object guide information M_R1_200 is acquired at the second visit to a place where the art object R1 is exhibited. Furthermore, the art object information illustrated in FIG. 12 indicates that at the third visit to the place where the art object R1 is exhibited, art object guide information M_R1_310 is acquired in a case where an appreciation direction is $\theta1$, and art object guide information M_R1_320 is acquired in a case where an appreciation direction is $\theta2$, art object guide information M_R1_330 is acquired in a case where an appreciation direction is $\theta3$, and art object guide information M_R1_340 is acquired in a case where an appreciation direction is $\theta4$. Furthermore, the art object information illustrated in FIG. 12 indicates that at the fourth visit to the place where the art object R1 is exhibited, art object guide information M_R1_402 is acquired in a case where the art object R2 has been already appreciated, art object guide information M_R1_403 is acquired in a case where the art object R3 has been already appreciated, art object guide information M_R1_404 is acquired in a case where the art object R4 has been already appreciated, and art object guide information M_R1_400 is acquired in a case where any of the art objects R2, R3, and R4 has not been appreciated.

In this example, the same art object guide information is defined for each of the viewing directions $\theta1$, $\theta2$, $\theta3$, and $\theta4$ irrespective of the art object that has been already appreciated, and the same art object guide information is defined for each of the art objects R2, R3, R4, and "other" that have been already appreciated irrespective of an appreciation direction. However, the present exemplary embodiment is not limited to this. Art object guide information that varies depending on an art object that has been already appreciated may be defined for each of the appreciation directions $\theta1$, $\theta2$, $\theta3$, and $\theta4$.

Figure 14:
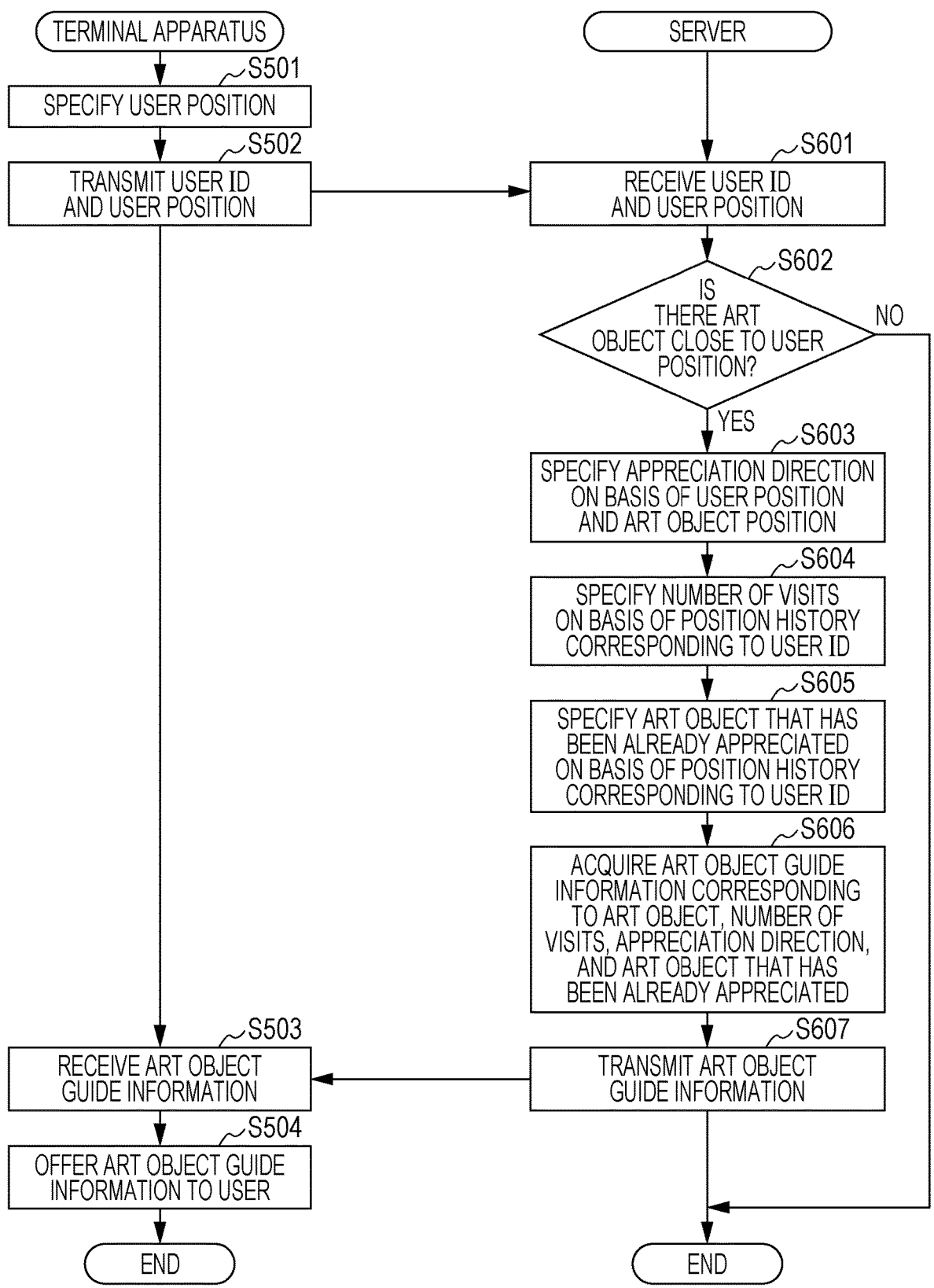
FIG. 14 is a sequence diagram illustrating an example of operation of the computer system according to the third exemplary embodiment of the present disclosure.

FIG. 14 is a sequence diagram illustrating an example of operation of the computer system 3 according to the third exemplary embodiment.

As illustrated in FIG. 14, in the terminal apparatus 50, first, the user position specifying unit 51 specifies a user position (Step 501).

Then, the transmitting unit 53 transmits a user ID and the user position specified in Step 501 to the server 60 (Step 502).

In the server 60, the receiving unit 61 receives the user ID and the user position transmitted in Step 502 (Step 601).

Then, the information acquisition unit 63 determines whether or not there is an art object close to the user position received in Step 601 while referring to the art object information stored in the information storage unit 62 (Step 602). This determining process need just be performed, for example, by examining whether or not there is an art object whose position is included in a circle of a predetermined radius around the user position received in Step 601.

In a case where it is determined as a result of this determining process that there is no art object close to the user position, the process is finished. Meanwhile, in a case where it is determined that there is an art object close to the user position, the information acquisition unit 63 specifies the art object. That is, the information acquisition unit 63 specifies an art object ID of the art object. Then, the information acquisition unit 63 specifies, as an art object appreciation direction, a direction from the user position received in Step 601 toward an art object position corresponding to the art object specified in Step 602 (Step 603).

Furthermore, the information acquisition unit 63 specifies, as the number of visits to an art object, the number of visits to a place where the art object specified in Step 602 is exhibited on the basis of a user position history corresponding to the user ID received in Step 601 while referring to the position history information stored in the information storage unit 62 (Step 604). As the user position history, a history of a day on which this process is performed may be referred to. For example, it is possible to count the number of user positions included in a predetermined radius around an art object position corresponding to the art object ID specified in Step 602 among user positions stored as a history on this day for the user ID received in Step 601 and use the number of user positions thus found as the number of visits. However, in a case where such user positions are consecutive in the history, these user positions are counted as one user position.

Furthermore, the information acquisition unit 63 specifies an art object that has been already appreciated other than the art object specified in Step 602 by examining whether or not a place where an art object other than the art object specified in Step 602 is exhibited has been already visited on the basis of the user position history corresponding to the user ID received in Step 601 while referring to the position history information stored in the information storage unit 62 (Step 605). That is, the information acquisition unit 63 specifies an appreciated art object ID that is an art object ID of an art object that has been already appreciated. As the user position history, a history of a day on which this process is performed may be referred to. For example, it is possible to examine whether or not a user position included in a predetermined radius around an art object position corresponding to an art object ID other than the art object ID specified in Step 602 is included in user positions stored as a history on this day for the user ID received in Step 601 and use the art object ID as the appreciated art object ID in a case where such a user position is included.

After an art object is specified in Step 602, an appreciation direction is specified in Step 603, the number of visits is specified in Step 604, and an art object that has been already appreciated is specified in Step 605, the information acquisition unit 63 acquires art object guide information corresponding to the art object, the number of visits, the appreciation direction, and the art object that has been already appreciated thus specified from the art object information stored in the information storage unit 62 (Step 606). Specifically, the information acquisition unit 63 acquires art object guide information that corresponds to the art object ID specified in Step 602, the number of visits to the art object specified in Step 604, the art object appreciation direction specified in Step 603, and the appreciated art object ID specified in Step 605 from the art object information stored in the information storage unit 62.

Then, the transmitting unit 64 transmits the art object guide information acquired in Step 606 to the terminal apparatus 50 (Step 607).

In the terminal apparatus 50, the receiving unit 54 receives the art object guide information transmitted in Step 607 (Step 503).

Then, the information output unit 55 offers the art object guide information received in Step 503 to the user (Step 504).

Fourth Exemplary Embodiment

The present exemplary embodiment is an exemplary embodiment for a case where a participant (user) wearing a terminal apparatus participates in a series of conferences, meetings, gatherings, or the like (hereinafter simply referred to as a "conference"). In the present exemplary embodiment, the terminal apparatus offers guide information (hereinafter referred to as "conference guide information") concerning a conference to the participant. The conference is an example of an event in which a user participates, and the conference guide information is an example of explanatory information explaining a past background of an event.

Participants in a series of conferences include a new participant, an absentee, and a dropout in addition to an initial participant. The initial participant is a participant who has participated in the series of conferences since the first session. The new participant is a participant who newly participates in a second or subsequent session. The absentee is a participant who did not participate in a second or subsequent session but participated in a session that follows the second or subsequent session again. The dropout is a participant who did not participate in a second or subsequent session and did not participate in a session that follows the second or subsequent session either.

Figure 15:
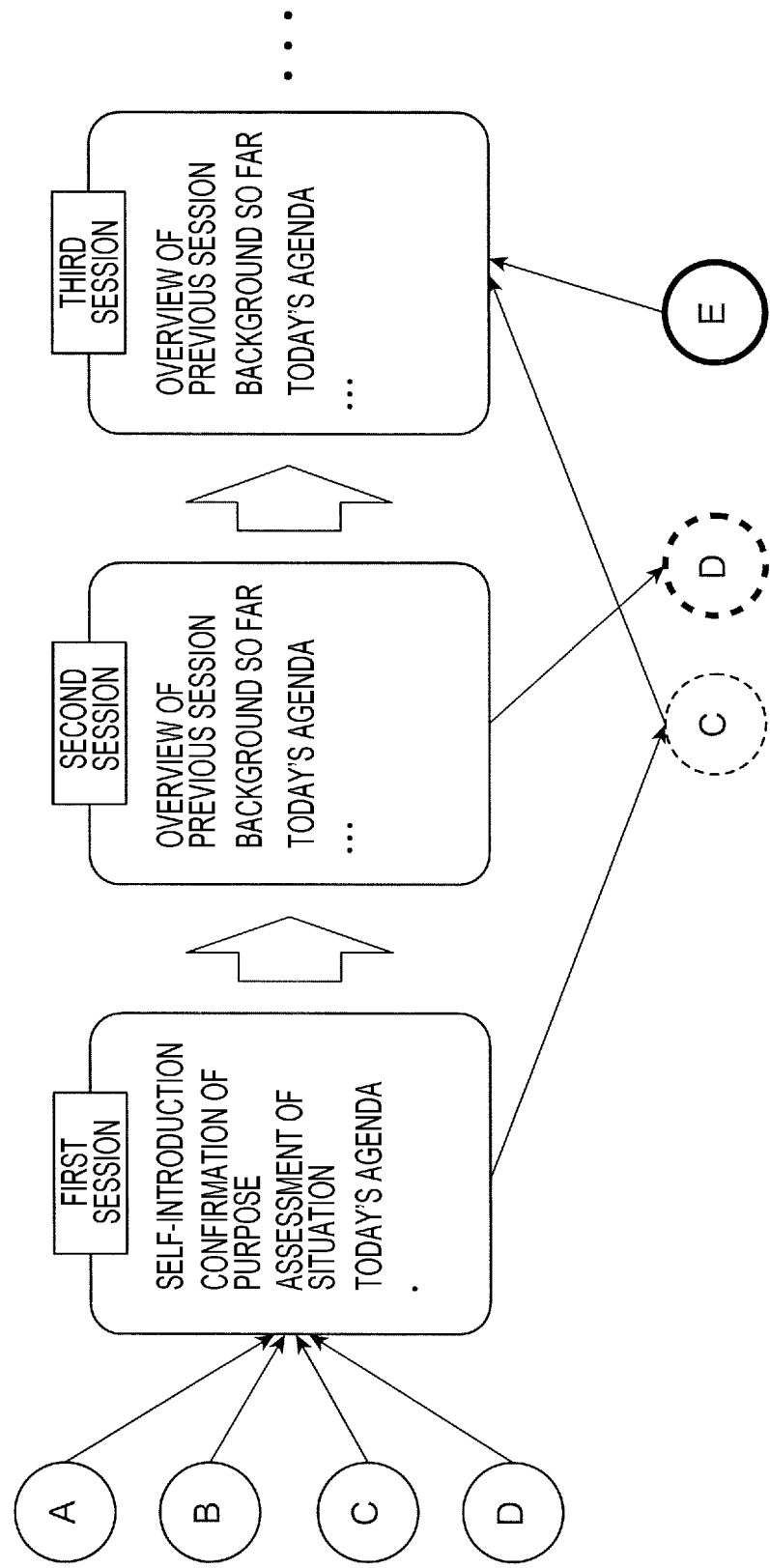
FIG. 15 illustrates an example of transition of participants of a series of conferences according to a fourth exemplary embodiment of the present disclosure.

FIG. 15 illustrates an example of transition of participants in a series of conferences. In FIG. 15, an initial participant is indicated by a thin solid-line circle, a new participant is indicated by a thick solid-line circle, an absentee is indicated by a thin broken-line circle, and a dropout is indicated by a thick broken-line circle. FIG. 15 shows that users A, B, C, and D participated in the first session as initial participants, the user C was absent in the second session, the user D dropped out after the second session, and a user E participated in the third session as a new participant.

In such a situation, in the second or subsequent session, it is necessary to explain a background so far to a new participant and an absentee absent in a previous session. However, such a background is information unnecessary for a participant who participated in the previous session, and explanation of such a background is a waste of time. It is desirable to present an overview of the previous session to the participant who participated in the previous session so that the participant who participated in the previous session can smoothly join the session. That is, among participants participating in a session, an overview of the previous session should be offered to a participant who participated in the previous session, and a background so far should be offered to a new participant and a participant who was absent in the previous session.

In view of this, in the present exemplary embodiment, in a case where a participant wearing a terminal apparatus participates in a conference, the terminal apparatus determines whether the participant participated in a previous session or is a new participant or a participant who was absent in the previous session on the basis of a past visit history detected by a position detection unit. As conference guide information, an overview of the previous session is offered to a participant who participated in the previous session and a background so far is offered to a new participant and a participant who was absent in the previous session with contents according to need of each participant so that the participants who participate in the session can have the same degree of understanding.

Figure 16:
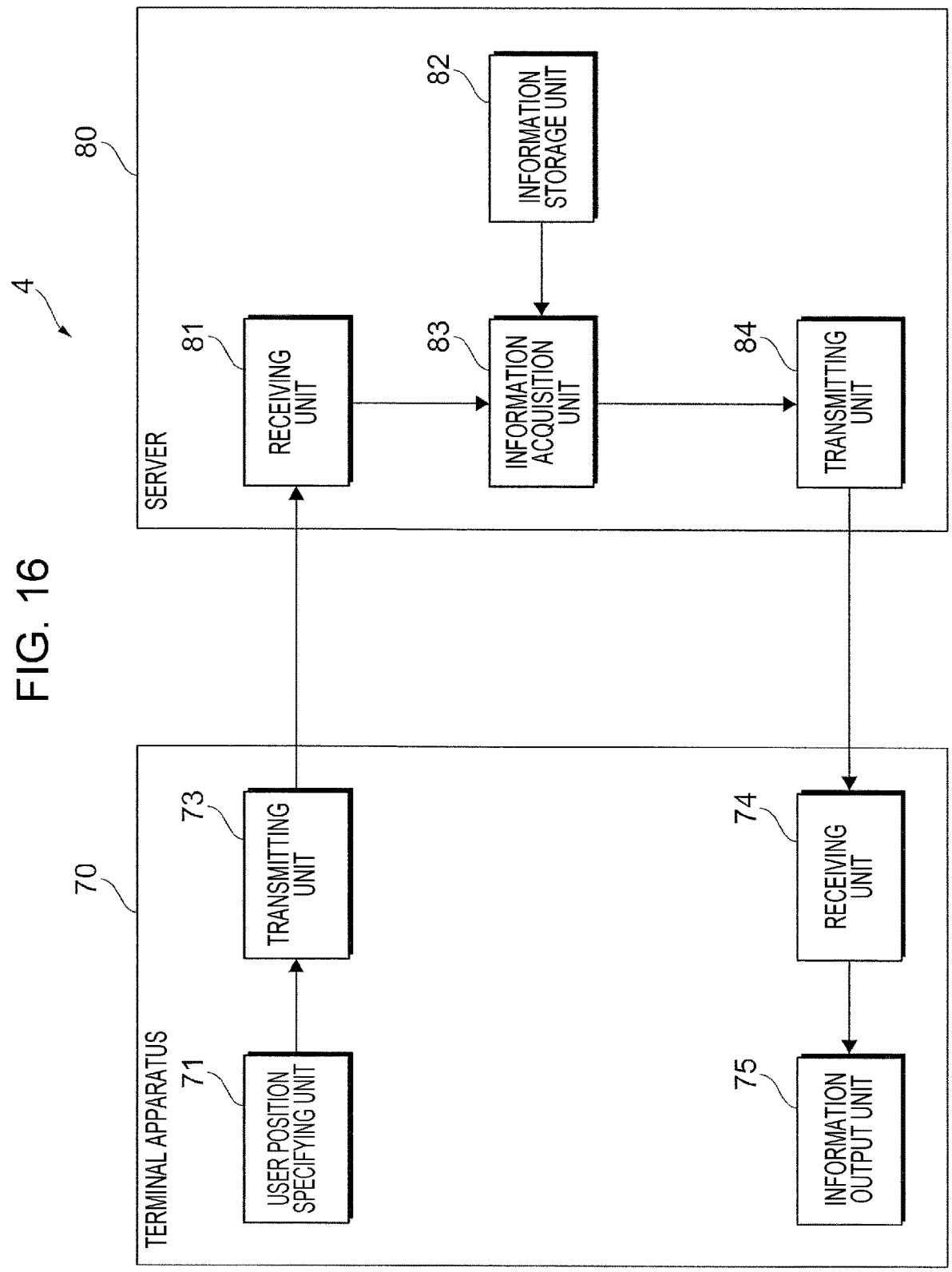
FIG. 16 is a block diagram illustrating an example of a functional configuration of a computer system according to the fourth exemplary embodiment of the present disclosure.

FIG. 16 is a block diagram illustrating an example of a functional configuration of a computer system 4 according to the fourth exemplary embodiment. As illustrated in FIG. 16, the computer system 4 according to the fourth exemplary embodiment is constituted by a terminal apparatus 70 that is an example of an information offering apparatus and a server 80 that is an example of a transmitting apparatus, and the terminal apparatus 70 and the server 80 are connected through a communication line.

First, a functional configuration of the terminal apparatus 70 is described. The terminal apparatus 70 includes a user position specifying unit 71, a transmitting unit 73, a receiving unit 74, and an information output unit 75.

The user position specifying unit 71 and the transmitting unit 73 are identical to the user position specifying unit 11 and the transmitting unit 13 according to the first exemplary embodiment, and therefore description thereof is omitted.

The receiving unit 74 receives conference guide information from the server 80. The conference guide information varies depending on a conference, a session held this time, and participation or absence in a previous session. In the present exemplary embodiment, the receiving unit 74 is provided as an example of a changing unit that changes target information in accordance with history information concerning a user's action.

The information output unit 75 supplies the conference guide information received by the receiving unit 74 to a user. Hereinafter, it is assumed that the conference guide information is output as voice through a sound output unit (see FIG. 19) although a way in which the conference guide information is output is not limited to this. In the present exemplary embodiment, the information output unit 75 is provided as an example of an offering unit that offers target information to a user.

Next, a functional configuration of the server 80 is described. The server 80 includes a receiving unit 81, an information storage unit 82, an information acquisition unit 83, and a transmitting unit 84.

The receiving unit 81 receives a user ID and a user position from the terminal apparatus 70.

The information storage unit 82 stores therein information (hereinafter referred to as "conference information") concerning a conference and history information (position history information) concerning a past user position. Specific contents of the conference information will be described later. Specific contents of the position history information have been described in the first exemplary embodiment, and therefore description thereof is omitted. However, in the present exemplary embodiment, the position history information is an example of visit history information indicating whether or not a user has visited a specific place. In the present exemplary embodiment, a user sometimes visits a conference room for a purpose different from participation in a conference. In view of this, in order to prevent position history information from influencing acquired conference guide information in such a case, it is also possible to set the terminal apparatus 70 in a conference mode only in a case where a user visits a conference room for the purpose of participation in a conference and record position history information only in a case where the terminal apparatus 70 is set in the conference mode. In this case, the position history information is an example of visit history information indicative of a history of a visit for a user's action to a specific place.

The information acquisition unit 83 specifies a conference held in a place close to the user position received by the receiving unit 81 and a session of the conference held this time while referring to the conference information stored in the information storage unit 82 and specifies participation or absence of the user in a previous session of the conference on the basis of a user position history corresponding to the user ID received by the receiving unit 81 while referring to the position history information stored in the information storage unit 82. Then, the information acquisition unit 83 acquires conference guide information corresponding to the conference, session held this time, and participation or absence in the previous session thus specified while referring to the conference information stored in the information storage unit 82.

The transmitting unit 84 transmits the conference guide information acquired by the information acquisition unit 83 to the terminal apparatus 70.

FIG. 17 illustrates an example of the conference information stored in the information storage unit 82. As illustrated in FIG. 17, the conference information is information in which a conference ID, a location where a conference is held, the number of held sessions of a conference, participation or absence in previous session, and conference guide information are associated.

The conference ID is identification information of a conference.

The location where a conference is held is a location, such as a conference room, where a conference identified by a corresponding conference ID is held. In this example, the location where a conference is held is indicated, for example, by a coordinate on an XY coordinate system preset on a conference room floor (not illustrated).

The number of held sessions of a conference is the number of held sessions of a conference identified by a corresponding conference ID. In this example, "1", which indicates a session held for the first time, to "4", which indicates a session held this time, are stored as the number of held sessions of the conference. That is, in a case where plural values are stored as the number of held sessions of a conference, a largest one of the values indicates a session held this time. It is assumed that a date and a time where a session is held are associated with each of the values indicative of the number of held sessions of the conference.

Participation or absence in a previous session is information indicating whether or not a user participated in a previous session of a conference identified by a corresponding conference ID. "YES" indicates that the user participated in the previous session, and "NO" indicates that the user did not participate in the previous session.

The conference guide information is guide information concerning a conference identified by a corresponding conference ID. Although conference guide information is indicated by symbols, for example, conference guide information M_S1_41 may be guide information concerning an overview of the third session of a conference S1, and conference guide information M_S1_40 may be guide information concerning a background so far of the conference S1.

For example, the conference information illustrated in FIG. 17 indicates that the conference S1 is held at a conference room or the like located at a coordinate (XS1, YS1). Furthermore, the conference information illustrated in FIG. 17 indicates that, at the fourth session of the conference S1 held this time, the conference guide information M_S1_41 is acquired for a user who participated in a previous session and the conference guide information M_S1_40 is acquired for a user who was absent in the previous session.

Figure 18:
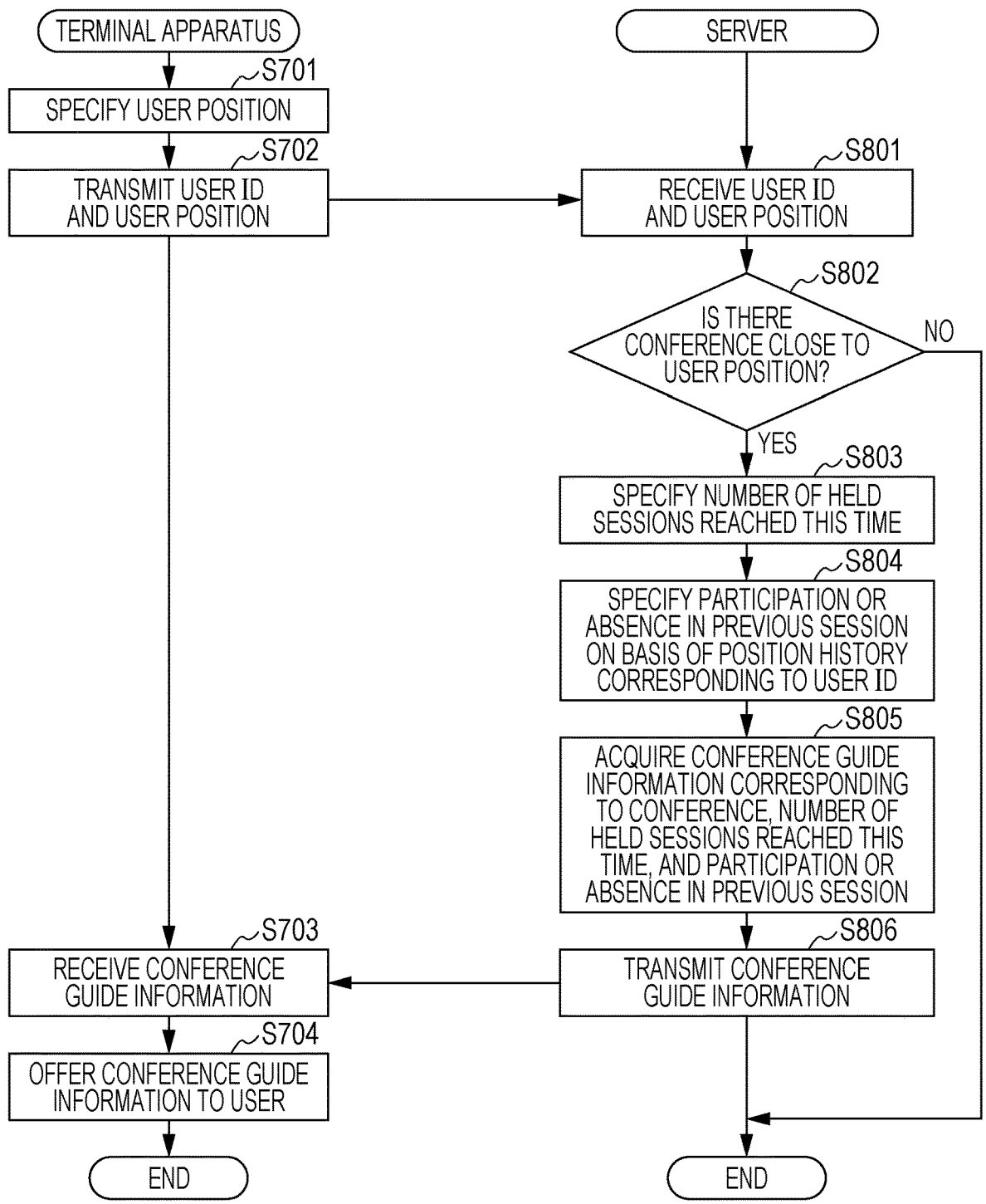
FIG. 18 is a sequence diagram illustrating an example of operation of the computer system according to the fourth exemplary embodiment of the present disclosure.

FIG. 18 is a sequence diagram illustrating an example of operation of the computer system 4 according to the fourth exemplary embodiment.

As illustrated in FIG. 18, in the terminal apparatus 70, first, the user position specifying unit 71 specifies a user position (Step 701).

Then, the transmitting unit 73 transmits a user ID and the user position specified in Step 701 to the server 80 (Step 702).

In the server 80, the receiving unit 81 receives the user ID and the user position transmitted in Step 702 (Step 801).

Then, the information acquisition unit 83 determines whether or not there is a conference held in a place close to the user position received in Step 801 while referring to the conference information stored in the information storage unit 82 (Step 802). This determining process need just be performed, for example, by examining whether or not there is a conference that is held in a location included in a circle of a predetermined radius around the user position received in Step 801.

In a case where it is determined as a result of this determining process that there is no conference held in a place close to the user position, the process is finished. Meanwhile, in a case where it is determined that there is a conference held in a place close to the user position, the information acquisition unit 83 specifies the conference. That is, the information acquisition unit 83 specifies a conference ID of the conference. Then, the information acquisition unit 83 specifies the number of sessions of the conference specified in Step 802 reached this time while referring to the conference information stored in the information storage unit 82 (Step 803). Specifically, the information acquisition unit 83 specifies, as number of sessions of the conference reached this time, a largest one of values indicative of the number of held sessions corresponding to the conference specified in Step 802.

Furthermore, the information acquisition unit 83 specifies, as participation or absence in a previous session, whether or not the user participated in the previous session of the conference specified in Step 802 on the basis of a user position history corresponding to the user ID received in Step 801 while referring to the position history information stored in the information storage unit 82 (Step 804). For example, first, the information acquisition unit 83 finds the number of held sessions of the conference reached last time that is smaller by 1 than the number of sessions of the conference reached this time specified in Step 803 while referring to the conference information stored in the information storage unit 82 and finds a date and a time associated with the number of held sessions of the conference reached last time. Next, the information acquisition unit 83 specifies participation or absence in the previous session by examining whether or not a user position included in a predetermined radius around a conference location corresponding to the conference specified in Step 802 is included in user positions stored as a history on this date and time for the user ID received in Step 801.

After a conference is specified in Step 802, the number of sessions of the conference reached this time is specified in Step 803, and participation or absence in a previous session is specified in Step 804, the information acquisition unit 83 acquires conference guide information corresponding to the conference, the number of sessions of the conference reached this time, and participation or absence in a previous session thus specified from the conference information stored in the information acquisition unit 83 (Step 805). Specifically, the information acquisition unit 83 acquires conference guide information that corresponds to the conference ID specified in Step 802, corresponds to the number of sessions of the conference specified in Step 803, and corresponds to participation or absence in a previous session specified in Step 804 from the conference information stored in the information storage unit 82.

Then, the transmitting unit 84 transmits the conference guide information acquired in Step 805 to the terminal apparatus 70 (Step 806).

In the terminal apparatus 70, the receiving unit 74 receives the conference guide information transmitted in Step 806 (Step 703).

Then, the information output unit 75 offers the conference guide information received in Step 703 to the user (Step 704).

Hardware Configuration of Terminal Apparatus

Each of the terminal apparatuses 10, 30, 50, and 70 according to the first through fourth exemplary embodiments may be a hearable device that directly offers information to an auditory organ of a user. Assume that each of the terminal apparatuses 10, 30, 50, and 70 is a hearable device 90, a hardware configuration of the hearable device 90 is described below.

FIG. 19 illustrates a hardware configuration of the hearable device 90. As illustrated in FIG. 19, the hearable device 90 includes a central processing unit (CPU) 91 that is a computing unit, and a main memory 92 and a hard disk drive (HDD) 93 that are memories. The CPU 91 executes various kinds of software such as an operating system (OS) and an application and serves as each of the processing units described above. The main memory 92 stores therein, for example, various kinds of software and data used for execution of the software, and the HDD 93 stores therein, for example, input data input to various kinds of software and output data output from the various kinds of software. Furthermore, the hearable device 90 includes an operation unit 94 used to perform various kinds of operations by a user, a communication interface (expressed as "communication I/F" in FIG. 19) 95 for communication with an outside, a sound input unit 96 that receives sound from a microphone or the like, and a sound output unit 97 that supplies sound to an earphone, a headphone, or the like. The earphone, headphone, or the like may be a bone-conduction earphone, a bone-conduction headphone, or the like that transmits sound by directly transmitting air vibration to a skull. Furthermore, the hearable device 90 includes a position detection unit 98 that detects a position of the hearable device 90 by using a global positioning system (GPS) and a direction detection unit 99 that detects a direction which the hearable device 90 is facing by using a geomagnetic sensor, an acceleration sensor, or the like. In the third and fourth exemplary embodiments, the direction detection unit 99 may not be included.

The hearable device 90 may be an earphone-type or headphone-type device. In a case where the hearable device 90 is an earphone-type device, the hearable device 90 includes an attachment unit for attachment of this device to one of the ears of the user. In a case where the hearable device 90 is a headphone-type device, the hearable device 90 includes an attachment unit for attachment of this device to the head of the user.

Alternatively, the hearable device 90 may be a mobile information terminal such as a smartphone or a tablet terminal connected to an earphone, a headphone, or the like.

Hardware Configuration of Server

Each of the servers 20, 40, 60, and 80 according to the first through fourth exemplary embodiments may be a general-purpose computer. Assume that each of the servers 20, 40, 60, and 80 is a computer 100, a hardware configuration of the computer 100 is described below.

Figure 20:
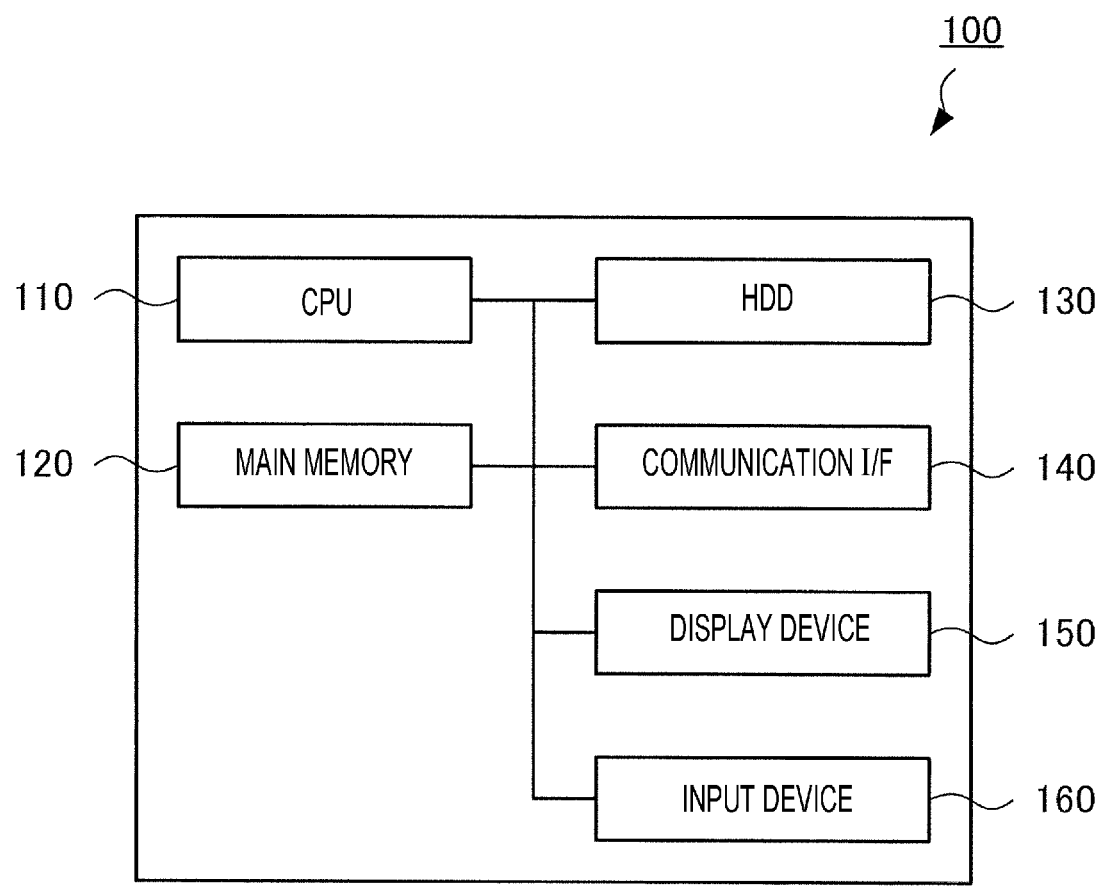
FIG. 20 illustrates an example of a hardware configuration of a server according to any of the first through fourth exemplary embodiments of the present disclosure.

FIG. 20 illustrates a hardware configuration of the computer 100. As illustrated in FIG. 20, the computer 100 includes a CPU 110 that is a computing unit, and a main memory 120 and an HDD 130 that are memories. The CPU 110 executes various kinds of software such as an OS and an application and serves as each of the processing units described above. The main memory 120 stores therein, for example, various kinds of software and data used for execution of the software, the HDD 130 stores therein, for example, input data input to various kinds of software and output data output from the various kinds of software, and one of or both of the main memory 120 and the HDD 130 serve(s) as each of the memories. Furthermore, the computer 100 includes a communication interface (expressed as "communication I/F" in FIG. 20) 140 for communication with an outside, a display device 150 such as a display, and an input device 160 such as a keyboard or a mouse.

Program

A process performed by the terminal apparatuses 10, 30, 50, and 70 according to the first through fourth exemplary embodiments is prepared, for example, as a program such as application software.

That is, a program that realizes the first through fourth exemplary embodiments is grasped as a program for causing a computer to realize a function of offering target information concerning a target of a user's action to a user and a function of changing the target information in accordance with history information concerning the user's action.

A program that realizes the first through fourth exemplary embodiments is also grasped as a program for causing a computer to realize a function of offering target information concerning a target of a user's action to a user and a function of controlling how the target information is offered in accordance with a relationship between a direction which the user is facing and a position of the target.

The program that realizes the present exemplary embodiments can be also offered through a communication unit or can be offered by being stored in a recording medium such as a CD-ROM.

The foregoing description of the exemplary embodiments of the present disclosure has been provided for the purposes of illustration and description. It is not intended to be exhaustive or to limit the present disclosure to the precise forms disclosed. Obviously, many modifications and variations will be apparent to practitioners skilled in the art. The embodiments were chosen and described in order to best explain the principles of the present disclosure and its practical applications, thereby enabling others skilled in the art to understand the present disclosure for various embodiments and with the various modifications as are suited to the particular use contemplated. It is intended that the scope of the present disclosure be defined by the following claims and their equivalents.

What is claimed is:

1. An information offering apparatus comprising:
    a processor configured to:
        offer target information concerning a target;
        determine whether a user visited a specific place for a first time or has visited the specific place plural times;
        select first contents in response to determining that the user has only visited the specific place one time; and
        change the target information in accordance with history information concerning a number of times a user has visited the specific place, wherein
    the target is an event in which the user participates; and
    the target information is explanatory information explaining a past background of the event.

2. The information offering apparatus according to claim 1, wherein
    the target is a target of action of a user in the specific place.

3. The information offering apparatus according to claim 1, wherein the processor is further configured to:
    select second contents, different from the first contents, in response to determining that the user has visited the specific place more than one time.

4. The information offering apparatus according to claim 1, wherein the processor is further configured to:
    change the target information based on (1) a number of sessions held of a conference, (2) position history corresponding to the user indicating participation or absence in a previous session of the conference, and (3) conference guide information corresponding to the previous session based on the indicated user's participation or absence in the previous session of the conference.

5. The information offering apparatus according to claim 1, wherein
    the target is a viewed object which the user sees; and
    the target information is explanatory information explaining the viewed object.

6. The information offering apparatus according to claim 5, wherein
    the processor is further configured to change the explanatory information in accordance with a direction from which the user sees the viewed object.

7. The information offering apparatus according to claim 5, wherein
    the processor is further configured to change the explanatory information in accordance with an order in which the user has seen a plurality of viewed objects including the viewed object.

8. The information offering apparatus according to claim 7, wherein
    the processor is further configured to change the explanatory information in accordance with a viewed object seen by the user before the viewed object among the plurality of viewed objects.

9. The information offering apparatus according to claim 1, wherein
    the target is a facility which the user checks; and
    the target information is instruction information indicative of an instruction concerning an item to be checked of the facility.

10. The information offering apparatus according to claim 9, wherein
    the instruction information is decided, for each time corresponding to the number of visits of the user to a place to be checked in the facility, on a basis of a history of an item of the facility checked in past.

11. The information offering apparatus according to claim 10, wherein the processor is further configured to:

acquire voice of the user indicative of the item to be checked of the facility; and update the history of the item of the facility checked in the past on a basis of the voice acquired by the acquisition unit.

12. An information offering apparatus comprising:

a processor configured to:

offer target information concerning a target;

determine whether a user visited a specific place for a first time or has visited the specific place plural times;

select first contents in response to determining that the user has only visited the specific place one time; and controls how the target information is offered in accordance with (1) history information concerning the number of times a user has visited the specific place and (2) a relationship between a direction which the user is facing and a position of the target, wherein the processor controls how the target information is offered in accordance with on which of a first side and a second side the target is present with respect to the direction which the user is facing, and the processor controls so that the target information is offered to an auditory organ on the first side of the user and is not offered to an auditory organ on the second side of the user in a case where the target is present on the first side with respect to the direction which the user is facing.

13. The information offering apparatus according to claim 12, wherein the target information is offered to the auditory organ on the first side of the user in a first sound volume and is offered to the auditory organ on the second side of the user in a second sound volume smaller than the first sound volume in a case where the target is present on the first side with respect to the direction which the user is facing.

14. The information offering apparatus according to claim 12, wherein the processor is further configured to:

select second contents, different from the first contents, in response to determining that the user has visited the specific place more than one time.

15. The information offering apparatus according to claim 14, wherein the processor is further configured to:

change the target information based on (1) a number of sessions held of a conference, (2) position history corresponding to the user indicating participation or absence in a previous session of the conference, and (3) conference guide information corresponding to the previous session based on the indicated user's participation or absence in the previous session of the conference.

16. A non-transitory computer readable medium storing a program causing a computer to execute a process, the process comprising:

offering target information concerning a target; and determining whether a user visited a specific place for a first time or has visited the specific place plural times;

selecting first contents in response to determining that the user has only visited the specific place one time; and changing the target information in accordance with history information concerning a number of times a user has visited the specific place, wherein the target is a facility which the user checks, the target information is instruction information indicative of an instruction concerning an item to be checked of the facility, the instruction information is decided, for each time corresponding to the number of visits of the user to a place to be checked in the facility, on a basis of a history of an item of the facility checked in past;

acquire voice of the user indicative of the item to be checked of the facility; and update the history of the item of the facility checked in the past on a basis of the voice acquired by the acquisition unit.

* * * * *